US 12,480,696 B2

(12) United States Patent
Koike et al.

(10) Patent No.: US 12,480,696 B2
(45) Date of Patent: Nov. 25, 2025

(54) REFRIGERATION CYCLE APPARATUS

(71) Applicant: Mitsubishi Electric Corporation, Tokyo (JP)

(72) Inventors: Takanori Koike, Tokyo (JP); Kazuyoshi Shinozaki, Tokyo (JP); Kosuke Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 127 days.

(21) Appl. No.: 18/548,142

(22) PCT Filed: Apr. 22, 2021

(86) PCT No.: PCT/JP2021/016241
§ 371 (c)(1),
(2) Date: Aug. 28, 2023

(87) PCT Pub. No.: WO2022/224390
PCT Pub. Date: Oct. 27, 2022

(65) Prior Publication Data
US 2024/0133597 A1  Apr. 25, 2024
US 2024/0230181 A9  Jul. 11, 2024

(51) Int. Cl.
*F25B 41/26* (2021.01)
*F25B 13/00* (2006.01)

(52) U.S. Cl.
CPC .............. *F25B 41/26* (2021.01); *F25B 13/00* (2013.01)

(58) Field of Classification Search
CPC .......... F25B 2500/06; F25B 2700/2104; F25B 2700/2106; F25B 49/005; F25B 49/02
See application file for complete search history.

(56) References Cited

U.S. PATENT DOCUMENTS 5,297,392 A     3/1994  Takata et al.
2003/0230107 A1 12/2003 Lee
(Continued)

FOREIGN PATENT DOCUMENTS

CN    110566689 A   12/2019
JP      2757584 B2   5/1998
(Continued)

OTHER PUBLICATIONS

Extended European Search Report dated Mar. 25, 2024 issued in corresponding European patent application No. 21937884.1.
(Continued)

*Primary Examiner* — Henry T Crenshaw
(74) *Attorney, Agent, or Firm* — POSZ LAW GROUP, PLC

(57) ABSTRACT

A refrigeration cycle apparatus includes a heat source side unit, a relay unit, and a plurality of load side units, the heat source side unit and the relay unit are connected by using a low-pressure pipe and a high-pressure pipe, and the relay unit and each of the plurality of load side units are connected by using a corresponding liquid branch pipe and a corresponding gas branch pipe. The heat source side unit includes a compressor configured to compress refrigerant, at least one flow switching valve configured to change a passage of refrigerant based on an operation mode, and at least one heat source side heat exchanger, and the relay unit includes six-way valves or pairs of four-way valves.

7 Claims, 15 Drawing Sheets

(56) References Cited

U.S. PATENT DOCUMENTS

| | | |
|---|---|---|
| 2016/0320100 A1 | 11/2016 | Okano |
| 2017/0284684 A1 | 10/2017 | Song et al. |
| 2018/0328639 A1 | 11/2018 | Koike et al. |
| 2019/0383526 A1 | 12/2019 | Nishiyama et al. |
| 2021/0063033 A1 | 3/2021 | Tanaka |
| 2022/0205687 A1 | 6/2022 | Hatomura et al. |

FOREIGN PATENT DOCUMENTS

| | | | |
|---|---|---|---|
| JP | 2001-241798 A | | 9/2001 |
| JP | 2004-020188 | * | 1/2004 |
| JP | 2004-020188 A | | 1/2004 |
| WO | 2015/140994 A1 | | 9/2015 |
| WO | 2017/130319 A1 | | 8/2017 |
| WO | 2018/055741 A1 | | 3/2018 |
| WO | 2019/215916 A1 | | 11/2019 |
| WO | 2020/261387 A1 | | 12/2020 |

OTHER PUBLICATIONS

International Search Report of the International Searching Authority mailed Jun. 8, 2021 for the corresponding International Patent Application No. PCT/JP2021/016241 (and English translation).
Office Action dated Jan. 23, 2024 issued in corresponding Japanese Patent Application No. JP 2023-515962 (and English machine translation).

* cited by examiner

REFRIGERATION CYCLE APPARATUS

CROSS REFERENCE TO RELATED APPLICATION

This application is a U.S. national stage application of PCT/JP2021/016241 filed on Apr. 22, 2021, the contents of which are incorporated herein by reference.

TECHNICAL FIELD

The present disclosure relates to a refrigeration cycle apparatus including a relay unit.

BACKGROUND ART

A refrigeration cycle apparatus including a heat source side unit, a relay unit, and multiple load side units are known in the art. For example, Patent Literature 1 discloses a refrigeration cycle apparatus configured to operate in the cooling only operation mode, the heating only operation mode, and the cooling main or heating main operation mode in which at least one load side unit is in cooling operation and at least one load side unit is in heating operation. The refrigeration cycle apparatus, which is disclosed in Patent Literature 1, allows refrigerant to always flow in one direction in any operation mode through two pipes connecting the heat source side unit and the relay unit.

CITATION LIST

Patent Literature

Patent Literature 1: International Publication No. 2017/130319

SUMMARY OF INVENTION

Technical Problem

In the heat source side unit and the relay unit in the refrigeration cycle apparatus according to Patent Literature 1, a large number of check valves and solenoid valves are necessary in order to flow the refrigerant in one direction through the two pipes connecting the heat source side unit and the relay unit regardless of the operation mode. Such an apparatus including a large number of valves has various disadvantages, such as a cost increase due to an increase in the number of components, a circuit of great complexity, the difficulty of maintenance and an increased probability of failure, and a decrease in the performance due to an increase in the pressure loss in the passages of refrigerant caused by the large number of valves.

To address such disadvantages, an object of the present disclosure is to provide a refrigeration cycle apparatus configured to achieve reduction in the number of components.

Solution to Problem

A refrigeration cycle apparatus according to an embodiment of the present disclosure includes a heat source side unit, a relay unit, and a plurality of load side units, the heat source side unit and the relay unit are connected by using a low-pressure pipe and a high-pressure pipe, and the relay unit and each of the plurality of load side units are connected by using a corresponding liquid branch pipe and a corresponding gas branch pipe. The heat source side unit includes a compressor configured to compress refrigerant, at least one flow switching valve configured to change a passage of refrigerant based on an operation mode, and at least one heat source side heat exchanger, and the relay unit includes six-way valves or pairs of four-way valves, each of the six-way valves or each of the pairs of four-way valves being connected to a corresponding one of the plurality of load side units, and a gas-liquid separator whose inlet is connected to the high-pressure pipe. Each of the six-way valves or each of the pairs of four-way valves is connected to a gas outlet of the gas-liquid separator, a liquid outlet of the gas-liquid separator, a gas branch pipe and a liquid branch pipe connected to the corresponding one of the plurality of load side units, and the low-pressure pipe.

Advantageous Effects of Invention

The refrigeration cycle apparatus according to an embodiment of the present disclosure includes a relay unit including a six-way valve or a pair of four-way valves and thus includes fewer components than an apparatus including multiple check valves and solenoid valves.

DESCRIPTION OF EMBODIMENTS

Figure 1:
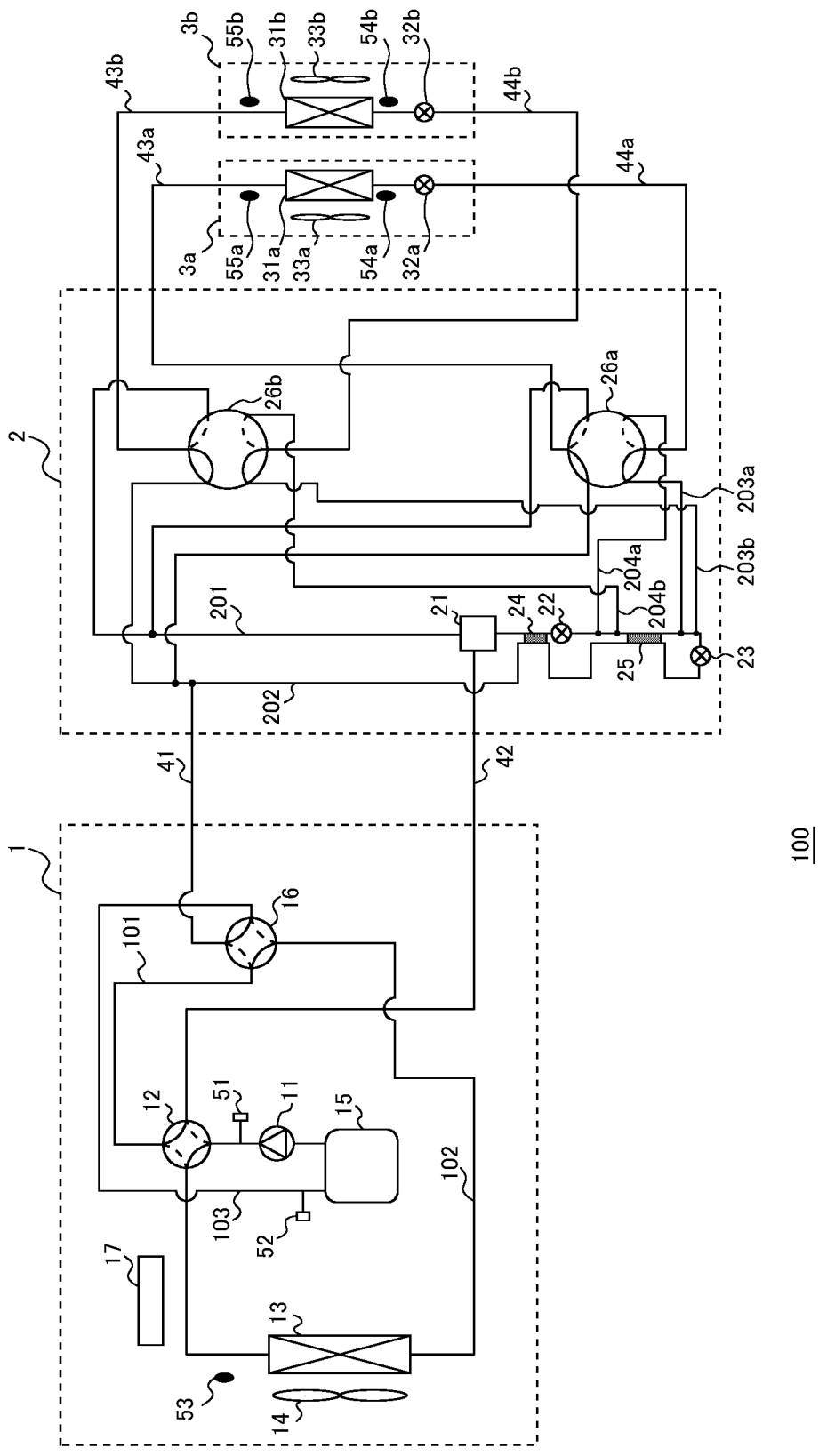
FIG. 1 is a refrigerant circuit diagram of a refrigeration cycle apparatus according to Embodiment 1.

Hereinafter, embodiments will be described with reference to the drawings. Items denoted by the same numeral or symbol in the drawings refer to the same items or equivalents thereof, and the same numerals or symbols are used in the entire specification. The sizes and shapes of the components depicted in the entire specification are described by way of example only and are not meant to be limiting. The relationships between the sizes of the components in the following drawings may differ from the relationships between the actual sizes of the components. In addition, high or low values of temperature, pressure, and other parameters used in the entire specification are not determined in relation to a particular absolute value and are relatively determined based on conditions or operation of apparatuses.

Embodiment 1

FIG. 1 is a refrigerant circuit diagram of a refrigeration cycle apparatus 100 according to Embodiment 1. The refrigeration cycle apparatus 100 is an air-conditioning apparatus that is installed, for example, in premises such as a commercial building or a condominium and that is configured to cool or heat an air-conditioning target space by using a refrigeration cycle (heat pump cycle) in which refrigerant is circulated.
(Configuration of Refrigeration Cycle Apparatus)

The refrigeration cycle apparatus 100 includes a heat source side unit 1, a relay unit 2, and a plurality of load side units 3a and 3b. The heat source side unit 1 is an outdoor unit to be installed outside an air-conditioning target space, such as outside a building. The relay unit 2 is to be installed outside the air-conditioning target space, such as above a ceiling of a building. The load side units 3a and 3b are indoor units to be installed inside the air-conditioning target space, for example, one each in different rooms.

The heat source side unit 1 and the relay unit 2 are connected by using a low-pressure pipe 41 and a high-pressure pipe 42. The relay unit 2 and the load side unit 3a are connected by using a gas branch pipe 43a and a liquid branch pipe 44a. The relay unit 2 and the load side unit 3b are connected by using a gas branch pipe 43b and a liquid branch pipe 44b. A refrigerant circuit of the refrigeration cycle apparatus 100 is configured by the heat source side unit 1, the relay unit 2, and the load side units 3a and 3b connected by using the pipes.

Any type of refrigerant may be used in the refrigeration cycle apparatus 100. For example, natural refrigerant, such as carbon dioxide, hydrocarbon, or helium, chlorine-free substitute refrigerant, such as HFC410A, HFC407C, or HFC404A, and chlorofluorocarbon refrigerant, such as R22 or R134a, which is used in existing products may be used in the refrigeration cycle apparatus 100.
(Heat Source Side Unit)

The heat source side unit 1 is configured to provide the load side units 3a and 3b with cooling energy or heating energy. The heat source side unit 1 includes a compressor 11, a first flow switching valve 12, a heat source side heat exchanger 13, a heat source side fan 14, an accumulator 15, a second flow switching valve 16, and a controller 17. The compressor 11, the first flow switching valve 12, the heat source side heat exchanger 13, the accumulator 15, and the second flow switching valve 16 in the heat source side unit 1 are connected by using pipes and form part of the refrigerant circuit.

The compressor 11 is configured to suction gas refrigerant at low temperature and low pressure, compress the refrigerant, and discharge gas refrigerant at high temperature and high pressure. The compressor 11 is configured to circulate refrigerant in the refrigerant circuit. The compressor 11 is, for example, a compressor of an inverter type capable of controlling capacity. Alternatively, the compressor 11 may be a constant-speed compressor, a combination of an inverter-type compressor and a constant-speed compressor, or a compressor of a different type. Various types of compressors, such as reciprocal, rotary, scroll, or screw compressors may be used as the compressor 11, as long as it compresses suctioned refrigerant into a high-pressure state.

The first flow switching valve 12 is, for example, a four-way valve. The first flow switching valve 12 is connected to the discharge side of the compressor 11, the heat source side heat exchanger 13, the second flow switching valve 16, and the high-pressure pipe 42. The first flow switching valve 12 is controlled by the controller 17 to change the passage of the refrigerant discharged from the compressor 11 based on the operation mode. The first flow switching valve 12 may be a combination of three-way valves or two-way valves.

The heat source side heat exchanger 13 is, for example, a heat exchanger of a fin-tube type. The heat source side heat exchanger 13 is configured to exchange heat between the air supplied by the heat source side fan 14 and refrigerant. The heat source side heat exchanger 13 is configured to function as an evaporator or a condenser based on the operation mode and evaporate or condense refrigerant.

The heat source side fan 14 is, for example, a propeller fan, a sirocco fan, or a cross flow fan. The heat source side fan 14 is configured to supply the heat source side heat exchanger 13 with air. The controller 17 is configured to control the rotation speed of the heat source side fan 14, and the condensing capacity or the evaporating capacity of the heat source side heat exchanger 13 is controlled.

The accumulator 15 is disposed on the suction side of the compressor 11 and has a function of separating liquid refrigerant and gas refrigerant and a function of storing excess refrigerant.

The second flow switching valve 16 is, for example, a four-way valve. The second flow switching valve 16 is connected to the first flow switching valve 12 by using a pipe 101 and connected to the heat source side heat exchanger 13 by using a pipe 102. The second flow switching valve 16 is also connected to the suction side of the compressor 11 by using a pipe 103 and via the accumulator 15, and connected to the relay unit 2 by using the low-pressure pipe 41. The second flow switching valve 16 is controlled by the controller 17 to change the passage of the refrigerant flowing into the relay unit 2 or the refrigerant flowing out of the relay unit 2 based on the operation mode.

The heat source side unit 1 also includes a high-pressure sensor 51 configured to measure the pressure of the refrigerant discharged from the compressor 11 and a low-pressure sensor 52 configured to measure the pressure of the refrigerant to be suctioned by the compressor 11. Further, the heat source side unit 1 also includes an outdoor air temperature sensor 53 configured to measure the outdoor air temperature. Each sensor is configured to send a measured pressure or temperature to the controller 17. In the following description, a pressure measured by the high-pressure sensor 51 is referred to as a "pressure on the high-pressure side", and a pressure measured by the low-pressure sensor 52 is referred to as a "pressure on the low-pressure side".

The controller 17 is, for example, a microcomputer including a central processing unit (CPU) and a memory. The controller 17 is configured to control each component in the refrigeration cycle apparatus 100 by executing a program stored in the memory by the CPU. For example, the controller 17 is configured to control the driving frequency of the compressor 11, the rotation speed of the heat source side fan 14, and the switching of the first flow switching valve 12 and the second flow switching valve 16 based on the pressure on the high-pressure side, the pressure on the low-pressure side, the outdoor air temperature, and an instruction from an input device such as a remote controller. Each function of the controller 17 may be executed by using a dedicated circuit such as an analog circuit or a digital circuit.

(Load Side Unit)

The load side units 3*a* and 3*b* are configured to provide cooling energy or heating energy supplied from the heat source side unit 1 based on a cooling load or a heating load of the air-conditioning target space.

The load side unit 3*a* includes a load side heat exchanger 31*a*, a load side expansion device 32*a*, and a load side fan 33*a*. The load side heat exchanger 31*a* and the load side expansion device 32*a* are connected in series and form a refrigerant circuit along with the heat source side unit 1 and the relay unit 2.

The load side heat exchanger 31*a* is, for example, a heat exchanger of a fin-tube type. The load side heat exchanger 31*a* is configured to exchange heat between the air supplied by the load side fan 33*a* and refrigerant. The load side heat exchanger 31*a* is configured to function as a condenser during a heating operation and condense and liquefy refrigerant. The load side heat exchanger 31*a* is also configured to function as an evaporator during a cooling operation and evaporate and gasify refrigerant.

The load side expansion device 32*a* is an electronic expansion valve whose opening degree is variably controlled. The load side expansion device 32*a* is configured to reduce the pressure of the refrigerant that flows into the load side heat exchanger 31*a* or that flows out of the load side heat exchanger 31*a* and expand the refrigerant. The load side expansion device 32*a* may be a capillary tube.

The load side fan 33*a* is, for example, a propeller fan, a sirocco fan, or a cross flow fan. The load side fan 33*a* is configured to provide the load side heat exchanger 31*a* with air in the air-conditioning target space. The controller 17 is configured to control the rotation speed of the load side fan 33*a*, and the condensing capacity or the evaporating capacity of the load side heat exchanger 31*a* is controlled.

The load side unit 3*b* includes a load side heat exchanger 31*b*, a load side expansion device 32*b*, and a load side fan 33*b*. The configurations of the load side heat exchanger 31*b*, the load side expansion device 32*b*, and the load side fan 33*b* in the load side unit 3*b* are the same as the configurations of the load side heat exchanger 31*a*, the load side expansion device 32*a*, and the load side fan 33*a* in the load side unit 3*a*, respectively.

In addition, the load side unit 3*a* includes a first temperature sensor 54*a* configured to measure the temperature of the pipe connecting the load side expansion device 32*a* and the load side heat exchanger 31*a* and a second temperature sensor 55*a* configured to measure the temperature of the gas branch pipe 43*a*. The load side unit 3*b* includes a first temperature sensor 54*b* configured to measure the temperature of the pipe connecting the load side expansion device 32*b* and the load side heat exchanger 31*b* and a second temperature sensor 55*b* configured to measure the temperature of the gas branch pipe 43*b*. The temperatures measured by the first temperature sensors 54*a* and 54*b* and the second temperature sensors 55*a* and 55*b* are sent to the controller 17. The controller 17 is configured to control the opening degrees of the load side expansion devices 32*a* and 32*b* and the rotation speeds of the load side fans 33*a* and 33*b* based on the received temperatures.

(Relay Unit)

The relay unit 2 is connected between the heat source side unit 1 and the load side units 3*a* and 3*b* and is configured to change the flow direction of refrigerant based on the operation of the load side unit 3*a* or 3*b*. Specifically, the relay unit 2 is configured to distribute low-temperature refrigerant to the load side unit 3*a* or 3*b*, which is in the cooling operation, and distribute high-temperature refrigerant to the load side unit 3*a* or 3*b*, which is in the heating operation.

The relay unit 2 includes a gas-liquid separator 21, a first expansion device 22, a second expansion device 23, a first refrigerant heat exchanger 24, a second refrigerant heat exchanger 25, and six-way valves 26*a* and 26*b*. The gas-liquid separator 21, the first expansion device 22, the second expansion device 23, the first refrigerant heat exchanger 24, the second refrigerant heat exchanger 25, and the six-way valves 26*a* and 26*b* in the relay unit 2 forms the refrigerant circuit along with the heat source side unit 1 and the load side units 3*a* and 3*b*.

The inlet of the gas-liquid separator 21 is connected to the high-pressure pipe 42, and the gas-liquid separator 21 is configured to separate the refrigerant flowing through the high-pressure pipe 42 into gas refrigerant and liquid refrigerant. The gas refrigerant that is separated by the gas-liquid separator 21 and that flows out of the gas outlet flows through a pipe 201 into the six-way valves 26*b* and 26*b*. The liquid refrigerant that is separated by the gas-liquid separator 21 and that flows out of the liquid outlet flows into the primary side of the first refrigerant heat exchanger 24.

The six-way valves 26*a* and 26*b* are configured to change the passages of the refrigerant to the load side units 3*a* and 3*b*, respectively, based on the operation mode. The six-way valve 26*a* is connected to the pipe 201, a pipe 202, a pipe 203*a*, a pipe 204*a*, the gas branch pipe 43*a*, and the liquid branch pipe 44*a*. The pipe 201 is connected to the gas outlet of the gas-liquid separator 21. The pipe 202 is connected to the low-pressure pipe 41 and the secondary outlet of the first refrigerant heat exchanger 24. The pipe 203*a* is connected to the pipe connecting the second refrigerant heat exchanger 25 and the second expansion device 23. The pipe 204*a* is connected to the pipe connecting the first expansion device 22 and the second refrigerant heat exchanger 25. Namely, the six-way valve 26*a* is connected to the liquid outlet of the gas-liquid separator 21 by using the pipes 203*a* and 204*a*.

When the load side unit 3*a* is in cooling operation, the six-way valve 26*a* is set by the controller 17 so that the pipe 203*a* and the liquid branch pipe 44*a* are in communication and the gas branch pipe 43*a* and the pipe 202 are in communication. When the load side unit 3*a* is in heating operation, the six-way valve 26*a* is set by the controller 17 so that the pipe 201 and the gas branch pipe 43*a* are in communication and the liquid branch pipe 44*a* and the pipe 204*a* are in communication.

The six-way valve 26*b* is connected to the pipe 201, the pipe 202, a pipe 203*b*, a pipe 204*b*, the gas branch pipe 43*b*, and the liquid branch pipe 44*b*. The pipe 203*b* is connected to the pipe connecting the second refrigerant heat exchanger 25 and the second expansion device 23. The pipe 204*b* is connected to the pipe connecting the first expansion device 22 and the second refrigerant heat exchanger 25. Namely, the six-way valve 26b is connected to the liquid outlet of the gas-liquid separator 21 by using the pipes 203b and 204b.

When the load side unit 3b is in cooling operation, the six-way valve 26b is set by the controller 17 so that the pipe 203b and the liquid branch pipe 44b are in communication and the gas branch pipe 43b and the pipe 202 are in communication. When the load side unit 3b is in heating operation, the six-way valve 26b is set by the controller 17 so that the pipe 201 and the gas branch pipe 43b are in communication and the liquid branch pipe 44b and the pipe 204b are in communication.

The first expansion device 22 is, for example, an electronic expansion valve whose opening degree is variably controlled. The first expansion device 22 is disposed between the primary side of the first refrigerant heat exchanger 24 and the primary side of the second refrigerant heat exchanger 25. The first expansion device 22 is configured to reduce the pressure of the refrigerant that flows out of the first refrigerant heat exchanger 24 and that flows into the second refrigerant heat exchanger 25 and expand the refrigerant. The first expansion device 22 may be a capillary tube.

The second expansion device 23 is, for example, an electronic expansion valve whose opening degree is variably controlled. The second expansion device 23 is disposed between the secondary side of the second refrigerant heat exchanger 25 and the six-way valves 26a and 26b. The second expansion device 23 is configured to reduce the pressure of refrigerant and expand the refrigerant after the refrigerant flows through the first expansion device 22 and the primary side of the second refrigerant heat exchanger 25. The second expansion device 23 may be a capillary tube.

The first refrigerant heat exchanger 24 is, for example, a double pipe heat exchanger. In the first refrigerant heat exchanger 24, heat is exchanged between the refrigerant flowing between the gas-liquid separator 21 and the first expansion device 22 and the refrigerant flowing out of the second refrigerant heat exchanger 25 after flowing through the second expansion device 23.

The second refrigerant heat exchanger 25 is, for example, a double pipe heat exchanger. In the second refrigerant heat exchanger 25, heat is exchanged between the refrigerant flowing out of the first expansion device 22 after flowing through the first refrigerant heat exchanger 24 and the refrigerant flowing out of the second expansion device 23. The passage from the liquid outlet of the gas-liquid separator 21 to the second expansion device 23 is referred to as the primary side of the first refrigerant heat exchanger 24 and the second refrigerant heat exchanger 25, and the passage from the second expansion device 23 to the pipe 202 is referred to as the secondary side of the first refrigerant heat exchanger 24 and the second refrigerant heat exchanger 25.

Since the relay unit 2 includes the first expansion device 22, the second expansion device 23, the first refrigerant heat exchanger 24, and the second refrigerant heat exchanger 25, the liquid refrigerant on the primary side, that is, the liquid refrigerant flowing out of the gas-liquid separator 21 can be subcooled. A temperature sensor that is not depicted is configured to measure the temperature of the refrigerant at the outlet of the second refrigerant heat exchanger 25 on the primary side, and the controller 17 is configured to control the opening degrees of the first expansion device 22 and the second expansion device 23 so that the measured temperature represents a target degree of subcooling.

(Operation of Refrigeration Cycle Apparatus)

Next, operation of the refrigeration cycle apparatus 100 will be described. The refrigeration cycle apparatus 100 is configured to operate in one of the four modes, which are the cooling only operation mode, the cooling main operation mode, the heating only operation mode, and the heating main operation mode. The controller 17 of the refrigeration cycle apparatus 100 is configured to receive an instruction for cooling operation or heating operation of the load side units 3a and 3b from devices such as remote controllers assigned one each to the load side units 3a and 3b. The controller 17 is configured to cause the refrigeration cycle apparatus 100 to operate in one of the four operation modes based on the received instruction.

Specifically, when both the load side units 3a and 3b are to run in cooling operation, the controller 17 causes the refrigeration cycle apparatus 100 to operate in the cooling only operation mode. When one of the load side units 3a and 3b is to run in cooling operation and the other is to run in heating operation, the controller 17 causes the refrigeration cycle apparatus 100 to operate in the cooling main operation mode if the controller 17 determines that the load for the cooling operation is heavier than the load for the heating operation. When both the load side units 3a and 3b are to run in heating operation, the controller 17 causes the refrigeration cycle apparatus 100 to operate in the heating only operation mode. When one of the load side units 3a and 3b is to run in cooling operation and the other is to run in heating operation, the controller 17 causes the refrigeration cycle apparatus 100 to operate in the heating main operation mode if the controller 17 determines that the load for the heating operation is heavier than the load for the cooling operation. Each operation mode will be described below.

(Cooling Only Operation Mode)

Figure 2:
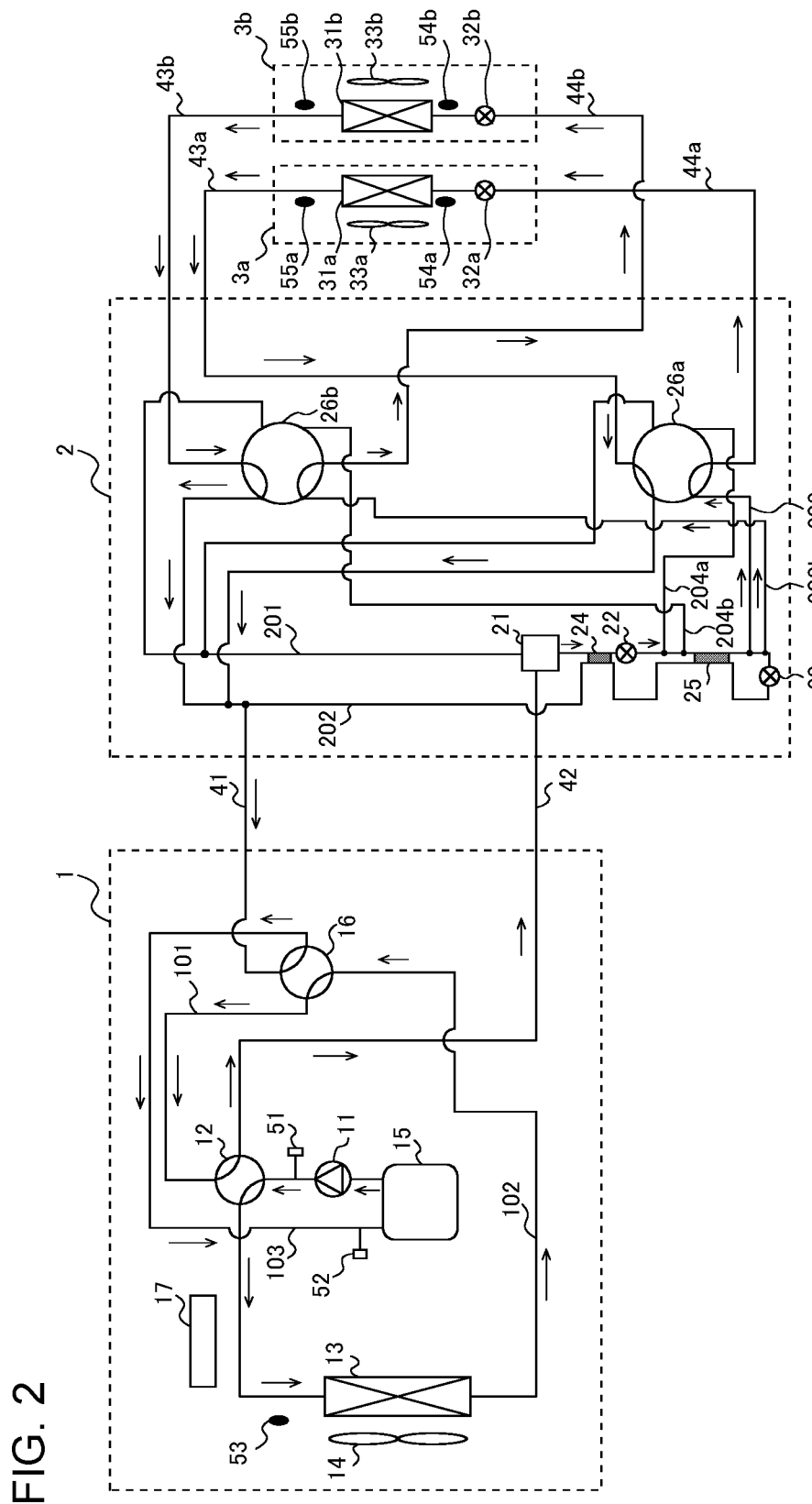
FIG. 2 illustrates the flow of refrigerant in the refrigeration cycle apparatus according to Embodiment 1, which is operating in the cooling only operation mode.

FIG. 2 illustrates the flow of refrigerant in the refrigeration cycle apparatus 100 according to Embodiment 1, which is operating in the cooling only operation mode. With reference to FIG. 2, description will be given with regard to the operation of the refrigeration cycle apparatus 100, which is operating in the cooling only operation mode. In the cooling only operation mode, the first flow switching valve 12 is set so that the discharge side of the compressor 11 and the heat source side heat exchanger 13 are in communication and the pipe 101 and the high-pressure pipe 42 are in communication. The second flow switching valve 16 is set so that the pipe 101 and the pipe 102 are in communication and the low-pressure pipe 41 and the pipe 103 are in communication. The six-way valve 26a is set so that the pipe 203a and the liquid branch pipe 44a are in communication and the gas branch pipe 43a and the pipe 202 are in communication. The six-way valve 26b is set so that the pipe 203b and the liquid branch pipe 44b are in communication and the gas branch pipe 43a and the pipe 202 are in communication.

The compressor 11 compresses refrigerant at low temperature and low pressure and discharges gas refrigerant at high temperature and high pressure. The gas refrigerant at high temperature and high pressure discharged from the compressor 11 flows through the first flow switching valve 12 and flows into the heat source side heat exchanger 13. The refrigerant flowing into the heat source side heat exchanger 13 exchanges heat with the air supplied by the heat source side fan 14 and condenses and liquefies. The liquid refrigerant flowing out of the heat source side heat exchanger 13 flows through the second flow switching valve 16, the first flow switching valve 12, and the high-pressure pipe 42 and flows out of the heat source side unit 1.

The liquid refrigerant at high pressure flowing out of the heat source side unit 1 flows into the gas-liquid separator 21 in the relay unit 2. The refrigerant flowing out of the liquid outlet of the gas-liquid separator 21 flows into the primary side of the first refrigerant heat exchanger 24. The liquid refrigerant flowing into the primary side of the first refrigerant heat exchanger 24 is cooled into a subcooled state by the refrigerant flowing on the secondary side of the first refrigerant heat exchanger 24. The pressure of the liquid refrigerant flowing out of the first refrigerant heat exchanger 24 is reduced to an intermediate pressure by the first expansion device 22. Then, the liquid refrigerant whose pressure is reduced by the first expansion device 22 flows into the primary side of the second refrigerant heat exchanger 25. The liquid refrigerant flowing into the primary side of the second refrigerant heat exchanger 25 is further cooled by the refrigerant flowing on the secondary side of the second refrigerant heat exchanger 25, and the degree of subcooling of the liquid refrigerant increases.

The liquid refrigerant flowing out of the second refrigerant heat exchanger 25 is branched into the flow to the pipe 203a, the flow to the pipe 203b, and the flow to the second expansion device 23. The refrigerant flowing into the pipe 203a flows through the six-way valve 26a and the liquid branch pipe 44a, and flows out of the relay unit 2 into the load side unit 3a. The refrigerant flowing into the pipe 203b flows through the six-way valve 26b and the liquid branch pipe 44b, and flows out of the relay unit 2 into the load side unit 3b.

The pressures of the liquid refrigerant flowing into the load side unit 3a and the liquid refrigerant flowing into the load side unit 3b are reduced by the load side expansion devices 32a and 32b, respectively, and the liquid refrigerant flowing into the load side unit 3a and the liquid refrigerant flowing into the load side unit 3b each become two-phase gas-liquid refrigerant at low temperature. The two-phase gas-liquid refrigerant at low temperature in the load side unit 3a and the two-phase gas-liquid refrigerant at low temperature in the load side unit 3b flow into the load side heat exchangers 31a and 32b, respectively. The refrigerant flowing into the load side heat exchanger 31a and the refrigerant flowing into the load side heat exchanger 31b exchange heat with the air supplied by the load side fan 33a and the air supplied by the load side fan 33b, respectively, and evaporate and gasify. The refrigerant removes heat from the air in the air-conditioning target space at this time, and the air-conditioning target spaces in which the load side units 3a and 3b are installed one each are cooled. Then, the refrigerant flowing out of the load side heat exchanger 31a flows through the gas branch pipe 43a, and flows out of the load side unit 3a into the relay unit 2. The refrigerant flowing out of the load side heat exchanger 31b flows through the gas branch pipe 43b, and flows out of the load side unit 3b into the relay unit 2.

The refrigerant flowing into the relay unit 2 flows through the six-way valves 26a and 26b, merges in the pipe 202 with the refrigerant flowing through the secondary side of the first refrigerant heat exchanger 24 and the secondary side of the second refrigerant heat exchanger 25, and flows into the low-pressure pipe 41.

The refrigerant flowing through the low-pressure pipe 41 flows into the heat source side unit 1 after flowing out of the relay unit 2. The refrigerant flowing into the heat source side unit 1 flows through the second flow switching valve 16 and the accumulator 15 and is suctioned again by the compressor 11.

(Cooling Main Operation Mode)

Figure 3:
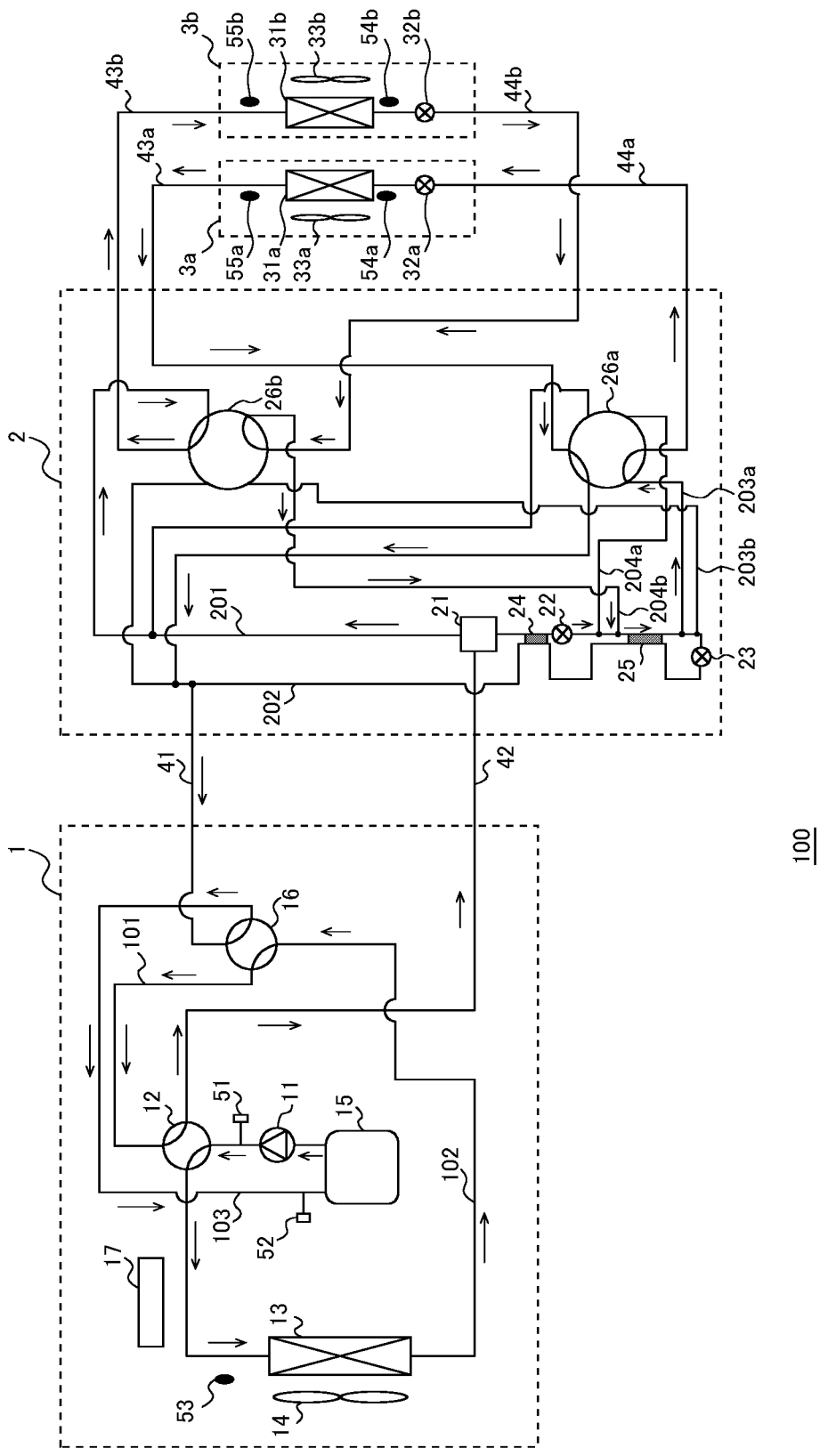
FIG. 3 illustrates the flow of refrigerant in the refrigeration cycle apparatus according to Embodiment 1, which is operating in the cooling main operation mode.

FIG. 3 illustrates the flow of refrigerant in the refrigeration cycle apparatus 100 according to Embodiment 1, which is operating in the cooling main operation mode. With reference to FIG. 3, description will be given with regard to the operation of the refrigeration cycle apparatus 100, which is operating in the cooling main operation mode. In the following description of the cooling main operation mode, it is assumed that the load side unit 3a runs in cooling operation and the load side unit 3b runs in heating operation. In the cooling main operation mode, the first flow switching valve 12, the second flow switching valve 16, and the six-way valve 26a are set in the same manner as in the cooling only operation mode. The six-way valve 26b is set so that the pipe 201 and the gas branch pipe 43b are in communication and the liquid branch pipe 44b and the pipe 204b are in communication. In addition, in the cooling main operation mode, the driving frequency of the compressor 11 or the rotation speed of the heat source side fan 14 is controlled so that two-phase gas-liquid refrigerant flows out of the heat source side unit 1.

The compressor 11 compresses refrigerant at low temperature and low pressure and discharges gas refrigerant at high temperature and high pressure. The gas refrigerant at high temperature and high pressure discharged from the compressor 11 flows through the first flow switching valve 12 and flows into the heat source side heat exchanger 13. The refrigerant flowing into the heat source side heat exchanger 13 exchanges heat with the air supplied by the heat source side fan 14 and condenses into two-phase gas-liquid refrigerant. The two-phase gas-liquid refrigerant flowing out of the heat source side heat exchanger 13 flows through the second flow switching valve 16, the first flow switching valve 12, and the high-pressure pipe 42 and flows out of the heat source side unit 1.

The two-phase gas-liquid refrigerant flowing out of the heat source side unit 1 flows into the gas-liquid separator 21 in the relay unit 2. The two-phase gas-liquid refrigerant flowing into the gas-liquid separator 21 is separated into gas refrigerant and liquid refrigerant in the gas-liquid separator 21. The gas refrigerant flows into the pipe 201 after flowing out of the gas-liquid separator 21. The gas refrigerant flowing into the pipe 201 flows through the six-way valve 26b and the gas branch pipe 43b into the load side unit 3b. The gas refrigerant flowing into the load side unit 3b exchanges heat in the load side heat exchanger 31b with the air supplied by the load side fan 33b and condenses and liquefies. The refrigerant transfers heat to the air in the air-conditioning target space at this time, and the air-conditioning target space in which the load side unit 3b is installed is heated. The pressure of the liquid refrigerant flowing out of the load side heat exchanger 31b is reduced to an intermediate pressure by the load side expansion device 32b.

The liquid refrigerant whose pressure is reduced to the intermediate pressure by the load side expansion device 32b flows through the liquid branch pipe 44b into the six-way valve 26b. The liquid refrigerant flowing into the six-way valve 26b flows through the pipe 204b, merges with the liquid refrigerant that is subcooled after flowing through the first refrigerant heat exchanger 24 and the first expansion device 22, and flows into the second refrigerant heat exchanger 25. The liquid refrigerant flowing into the second refrigerant heat exchanger 25 is further cooled by heat exchange with the refrigerant flowing on the secondary side, and the degree of subcooling of the liquid refrigerant increases. The refrigerant flowing out of the second refrigerant heat exchanger 25 is branched into the flow to the pipe 203a and the flow to the second expansion device 23. The refrigerant flowing into the pipe 203a flows out of the relay unit 2 after flowing through the six-way valve 26a and the liquid branch pipe 44a, and flows into the load side unit 3a.

The pressure of the liquid refrigerant flowing into the load side unit 3a is reduced by the load side expansion device 32a, and the liquid refrigerant flowing into the load side unit 3a becomes two-phase gas-liquid refrigerant at low temperature. The two-phase gas-liquid refrigerant at low temperature flows into the load side heat exchanger 31a, exchanges heat with the air supplied by the load side fan 33a, and evaporates and gasifies. The refrigerant removes heat from the air in the air-conditioning target space at this time, and the air-conditioning target space in which the load side unit 3a is installed is cooled. Then, the refrigerant flowing out of the load side heat exchanger 31a flows through the gas branch pipe 43a, and flows out of the load side unit 3a into the relay unit 2.

The refrigerant flowing into the relay unit 2 flows through the six-way valve 26a, merges in the pipe 202 with the refrigerant flowing through the secondary side of the first refrigerant heat exchanger 24 and the secondary side of the second refrigerant heat exchanger 25, and flows into the low-pressure pipe 41.

The refrigerant flowing through the low-pressure pipe 41 flows out of the relay unit 2 into the heat source side unit 1. The gas refrigerant flowing into the heat source side unit 1 flows through the second flow switching valve 16 and the accumulator 15 and is suctioned again by the compressor 11.

(Heating Only Operation Mode)

Figure 4:
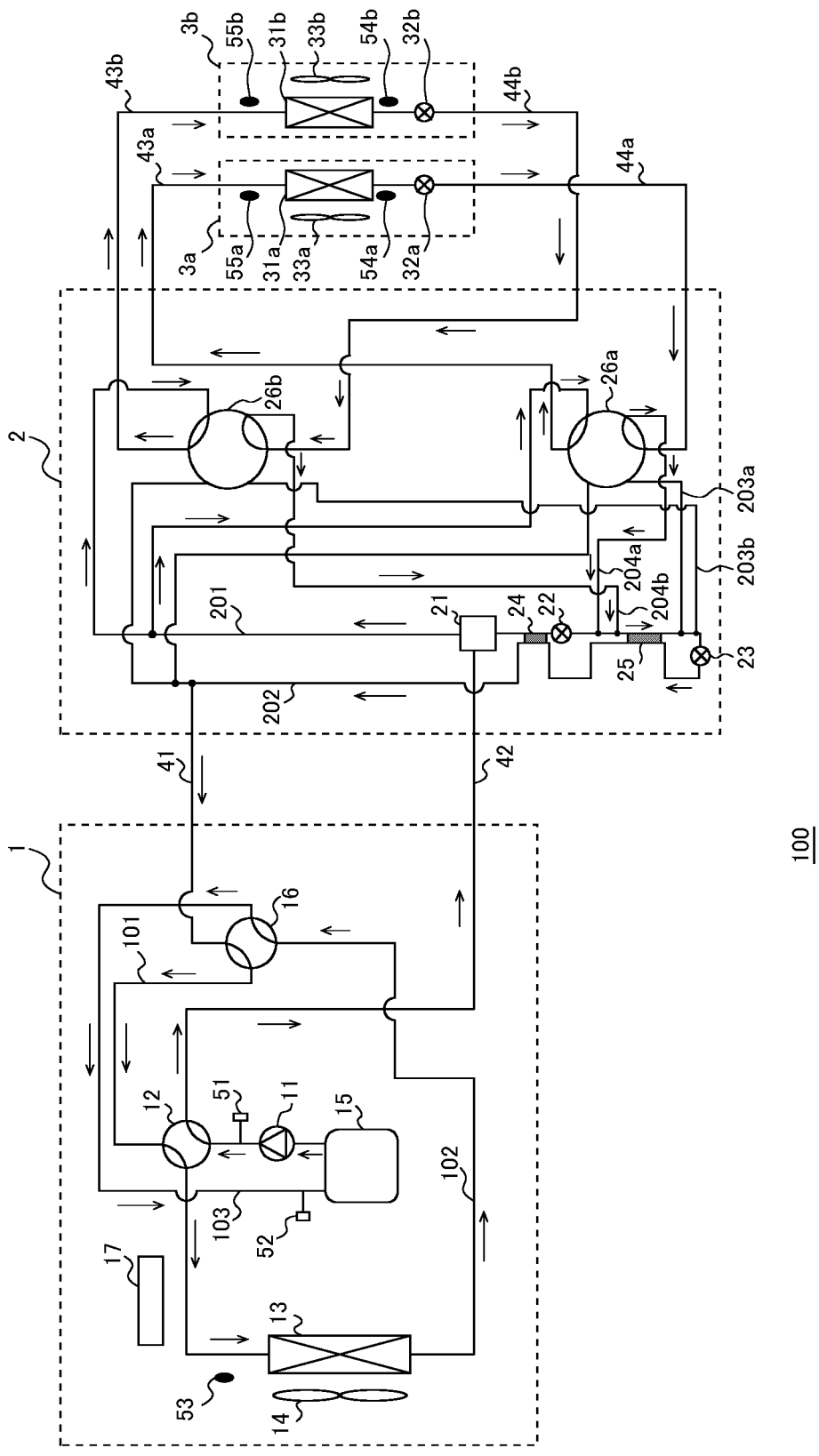
FIG. 4 illustrates the flow of refrigerant in the refrigeration cycle apparatus according to Embodiment 1, which is operating in the heating only operation mode.

FIG. 4 illustrates the flow of refrigerant in the refrigeration cycle apparatus 100 according to Embodiment 1, which is operating in the heating only operation mode. With reference to FIG. 4, description will be given with regard to the operation of the refrigeration cycle apparatus 100, which is operating in the heating only operation mode. In the heating only operation mode, the first flow switching valve 12 is set so that the discharge side of the compressor 11 and the high-pressure pipe 42 are in communication and the pipe 101 and the heat source side heat exchanger 13 are in communication. The second flow switching valve 16 is set so that the pipe 101 and the low-pressure pipe 41 are in communication and the pipe 102 and the pipe 103 are in communication. The six-way valve 26a is set so that the pipe 204a and the liquid branch pipe 44a are in communication and the gas branch pipe 43a and the pipe 201 are in communication. The six-way valve 26b is set so that the pipe 204b and the liquid branch pipe 44b are in communication and the gas branch pipe 43a and the pipe 201 are in communication.

The compressor 11 compresses refrigerant at low temperature and low pressure and discharges gas refrigerant at high temperature and high pressure. The gas refrigerant at high temperature and high pressure discharged from the compressor 11 flows through the first flow switching valve 12 and flows into the high-pressure pipe 42. The refrigerant flowing into the high-pressure pipe 42 flows out of the heat source side unit 1.

The gas refrigerant at high temperature and high pressure flowing out of the heat source side unit 1 flows into the gas-liquid separator 21 in the relay unit 2. The gas refrigerant flowing out of the gas outlet of the gas-liquid separator 21 flows through the pipe 201 into the six-way valves 26a and 26b. The gas refrigerant at high temperature and high pressure flowing through the six-way valve 26a flows through the gas branch pipe 43a into the load side unit 3a, and the gas refrigerant at high temperature and high pressure flowing through the six-way valve 26b flows through the gas branch pipe 43b into the load side unit 3b.

The gas refrigerant flowing into the load side unit 3a and the gas refrigerant flowing into the load side unit 3b flow into the load side heat exchangers 31a and 31b, respectively. The refrigerant flowing into the load side heat exchanger 31a and the refrigerant flowing into the load side heat exchanger 31b exchange heat with the air supplied by the load side fan 33a and the air supplied by the load side fan 33b, respectively, and condense and liquefy. The refrigerant transfers heat to the air in the air-conditioning target space at this time, and the air-conditioning target spaces in which the load side units 3a and 3b are installed one each are heated. The pressures of the liquid refrigerant flowing out of the load side heat exchanger 31a and the liquid refrigerant flowing out of the load side heat exchanger 31b are reduced by the load side expansion device 32a and the load side expansion device 32b, respectively. The liquid refrigerant whose pressure is reduced by the load side expansion device 32a flows through the liquid branch pipe 44a, and flows out of the load side unit 3a into the relay unit 2. The liquid refrigerant whose pressure is reduced by the load side expansion device 32b flows through the liquid branch pipe 44b, and flows out of the load side unit 3b into the relay unit 2.

The liquid refrigerant flowing into the relay unit 2 flows through the six-way valves 26a and 26b and the pipes 204a and 204b and flows into the second refrigerant heat exchanger 25 after flowing through the pipe between the first expansion device 22 and the inlet on the primary side of the second refrigerant heat exchanger 25. After flowing through the second refrigerant heat exchanger 25, the liquid refrigerant flows through the second expansion device 23 and the pipe 202 into the low-pressure pipe 41.

The refrigerant flowing through the low-pressure pipe 41 flows out of the relay unit 2 into the heat source side unit 1. The refrigerant flowing into the heat source side unit 1 flows through the second flow switching valve 16 and the first flow switching valve 12 and flows into the heat source side heat exchanger 13. The refrigerant flowing into the heat source side heat exchanger 13 exchanges heat with the air supplied by the heat source side fan 14 and evaporates and gasifies. The refrigerant flowing out of the heat source side heat exchanger 13 flows through the second flow switching valve 16 and the accumulator 15 and is suctioned again by the compressor 11.

(Heating Main Operation Mode)

Figure 5:
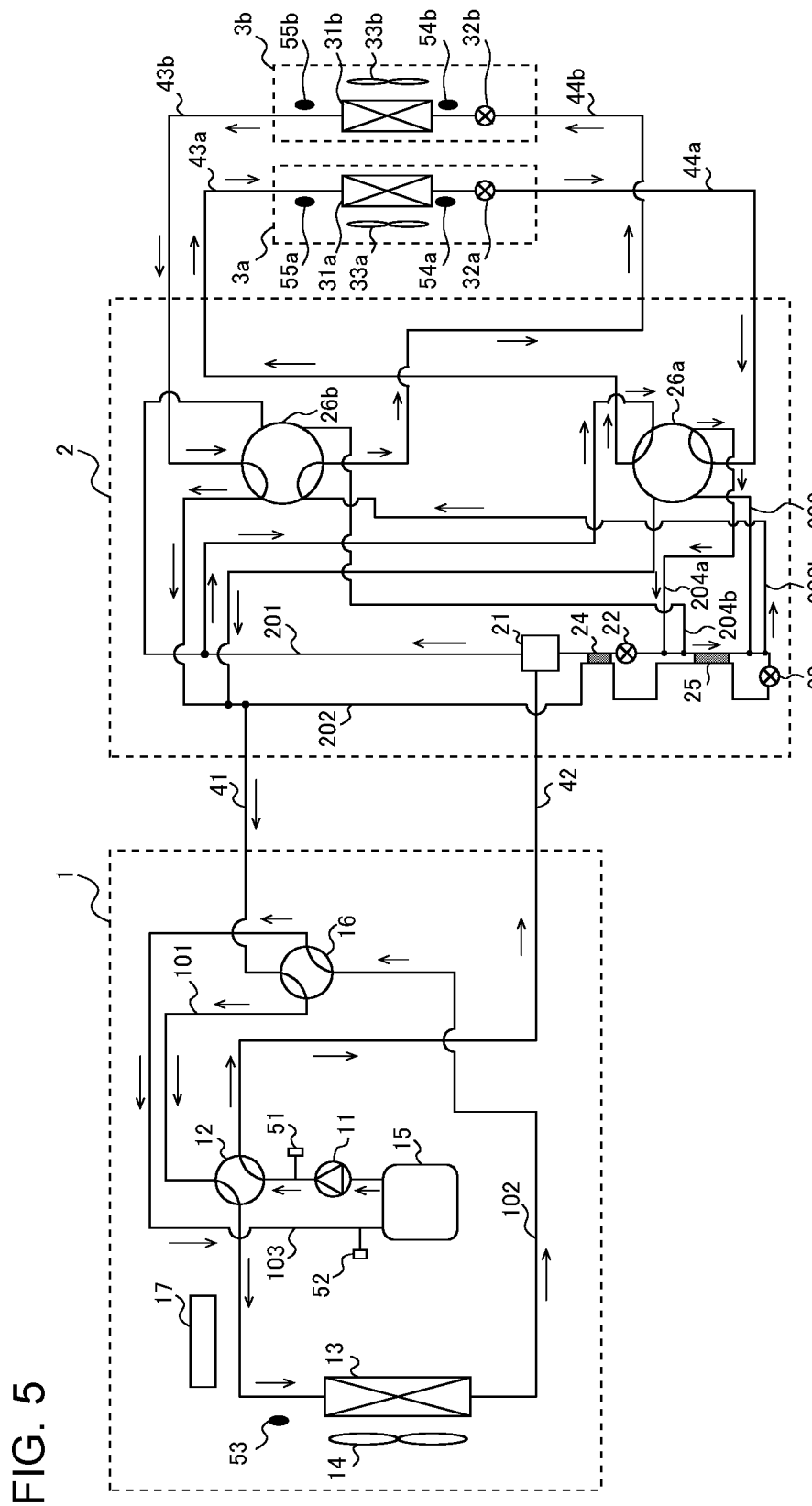
FIG. 5 illustrates the flow of refrigerant in the refrigeration cycle apparatus according to Embodiment 1, which is operating in the heating main operation mode.

FIG. 5 illustrates the flow of refrigerant in the refrigeration cycle apparatus 100 according to Embodiment 1, which is operating in the heating main operation mode. With reference to FIG. 5, description will be given with regard to the operation of the refrigeration cycle apparatus 100, which is operating in the heating main operation mode. In the following description of the heating main operation mode, it is assumed that the load side unit 3a runs in heating operation and the load side unit 3b runs in cooling operation. In the heating main operation mode, the first flow switching valve 12, the second flow switching valve 16, and the six-way valve 26a are set in the same manner as in the heating only operation mode. The six-way valve 26b is set so that the pipe 203b and the liquid branch pipe 44b are in communication and the gas branch pipe 43a and the pipe 202 are in communication.

The compressor 11 compresses refrigerant at low temperature and low pressure and discharges gas refrigerant at high temperature and high pressure. The gas refrigerant at high temperature and high pressure discharged from the compressor 11 flows through the first flow switching valve 12 and flows into the high-pressure pipe 42. The refrigerant flowing into the high-pressure pipe 42 flows out of the heat source side unit 1.

The gas refrigerant at high temperature and high pressure flowing out of the heat source side unit 1 flows into the gas-liquid separator 21 in the relay unit 2. The gas refrigerant at high temperature and high pressure flowing out of the gas outlet of the gas-liquid separator 21 flows through the pipe 201 into the six-way valve 26a. The gas refrigerant flowing through the six-way valve 26a flows through the gas branch pipe 43a into the load side unit 3a.

The gas refrigerant flowing into the load side unit 3a flows into the load side heat exchanger 31a. The refrigerant flowing into the load side heat exchanger 31a exchanges heat with the air supplied by the load side fan 33a and condenses and liquefies. The refrigerant transfers heat to the air in the air-conditioning target space at this time, and the air-conditioning target space in which the load side unit 3a is installed is heated. The pressure of the liquid refrigerant flowing out of the load side heat exchanger 31a is reduced by the load side expansion device 32a. The liquid refrigerant whose pressure is reduced by the load side expansion device 32a flows through the liquid branch pipe 44a, and flows out of the load side unit 3a into the relay unit 2.

The liquid refrigerant flowing into the relay unit 2 flows through the six-way valve 26a and the pipe 204a into the second refrigerant heat exchanger 25. The refrigerant flowing into the second refrigerant heat exchanger 25 is cooled into a subcooled state by heat exchange with the refrigerant flowing on the secondary side of the second refrigerant heat exchanger 25 and flows out of the second refrigerant heat exchanger 25. The liquid refrigerant flowing out of the second refrigerant heat exchanger 25 is branched into the flow to the pipe 203b and the flow to the second expansion device 23. The refrigerant flowing into the pipe 203b flows out of the relay unit 2 after flowing through the six-way valve 26b and the liquid branch pipe 44b and flows into the load side unit 3b.

The pressure of the liquid refrigerant flowing into the load side unit 3b is reduced by the load side expansion device 32b, and the liquid refrigerant flowing into the load side unit 3b becomes two-phase gas-liquid refrigerant at low temperature. The two-phase gas-liquid refrigerant at low temperature flows into the load side heat exchanger 31b, exchanges heat with the air supplied by the load side fan 33b, and evaporates and gasifies. The refrigerant removes heat from the air in the air-conditioning target space at this time, and the air-conditioning target space is cooled. The refrigerant flowing out of the load side heat exchanger 31b flows through the gas branch pipe 43b, and flows out of the load side unit 3b into the relay unit 2.

The refrigerant flowing into the relay unit 2 flows through the six-way valve 26b, merges in the pipe 202 with the refrigerant flowing through the secondary side of the second refrigerant heat exchanger 25, and flows into the low-pressure pipe 41.

The refrigerant flowing into the low-pressure pipe 41 flows out of the relay unit 2 into the heat source side unit 1. The refrigerant flowing into the heat source side unit 1 flows through the second flow switching valve 16 and the first flow switching valve 12 and flows into the heat source side heat exchanger 13. The refrigerant flowing into the heat source side heat exchanger 13 exchanges heat with the air supplied by the heat source side fan 14 and evaporates and gasifies. The refrigerant flowing out of the heat source side heat exchanger 13 flows through the second flow switching valve 16 and the accumulator 15 and is suctioned again by the compressor 11.

As described above, since the passages of refrigerant are changed by the second flow switching valve 16 and the six-way valves installed one each for the load side units, the refrigeration cycle apparatus 100 according to Embodiment 1 includes fewer components and fewer kinds of components than a refrigeration cycle apparatus known in the art having the configuration including a large number of check valves and solenoid valves. The present configuration can achieve cost reduction, a simplified configuration of a refrigerant circuit, improved maintenance and a decreased probability of failure, and improved performance due to a decrease in the pressure loss in the passages of refrigerant attributable to smaller number of valves. In particular, since the heat source side unit 1 does not include a check valve, which causes a pressure loss during operation in the cooling only operation mode or the cooling main operation mode, the pressure loss can be decreased, and a decrease in cooling performance can be avoided.

In the refrigeration cycle apparatus 100 according to Embodiment 1, the refrigerant in the low-pressure pipe 41 and the refrigerant in the high-pressure pipe 42 flow in opposite directions. And the refrigerant always flow in the same directions in each of the low-pressure pipe 41 and the refrigerant in the high-pressure pipe 42 in any operation mode. This configuration achieves stable operation of the refrigeration cycle apparatus 100.

Further, since the refrigerant flows in the heat source side heat exchanger 13 in the same direction in any operation mode, the refrigerant in the heat source side heat exchanger 13 and the air can be made to always flow in opposite directions. This configuration achieves improved performance of the heat exchanger.

Embodiment 2

(Configuration of Refrigeration Cycle Apparatus)

Figure 6:
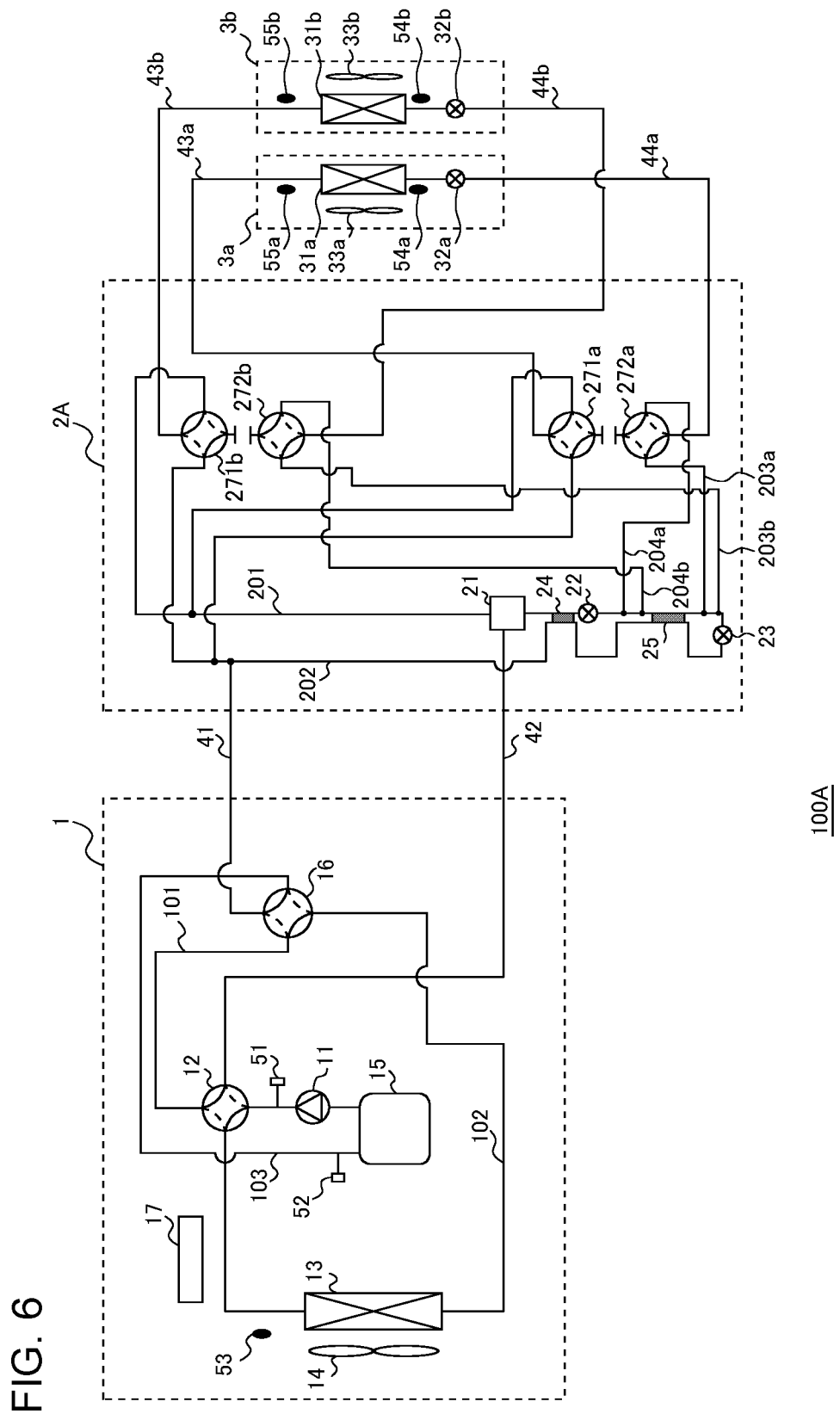
FIG. 6 is a refrigerant circuit diagram of a refrigeration cycle apparatus according to Embodiment 2.

FIG. 6 is a refrigerant circuit diagram of a refrigeration cycle apparatus 100A according to Embodiment 2. The refrigeration cycle apparatus 100A in Embodiment 2 differs in the configuration of a relay unit 2A from the refrigeration cycle apparatus 100 in Embodiment 1. The configurations of the heat source side unit 1 and the load side units 3a and 3b in the refrigeration cycle apparatus 100A are the same as the configurations of those in Embodiment 1.

(Relay Unit)

The relay unit 2A includes a gas-liquid separator 21, a first expansion device 22, a second expansion device 23, a first refrigerant heat exchanger 24, a second refrigerant heat exchanger 25, first four-way valves 271a and 271b, and second four-way valves 272a and 272b. Namely, the relay unit 2A according to Embodiment 2 includes the first four-way valve 271a and the second four-way valve 272a instead of the six-way valve 26a in Embodiment 1 and the first four-way valve 271b and the second four-way valve 272b instead of the six-way valve 26b in Embodiment 1.

The inlet of the gas-liquid separator 21 is connected to the high-pressure pipe 42, and the gas-liquid separator 21 is configured to separate the refrigerant flowing through the high-pressure pipe 42 into gas refrigerant and liquid refrigerant. The gas refrigerant that is separated by the gas-liquid separator 21 and that flows out of the gas outlet flows through a pipe 201 into the first four-way valves 271a and 271 b. The liquid refrigerant that is separated by the gas-liquid separator 21 and that flows out of the liquid outlet flows into the primary side of the first refrigerant heat exchanger 24.

The first four-way valve 271a and the second four-way valve 272a are configured to change the passage of the refrigerant to the load side unit 3a based on the operation mode. The first four-way valve 271b and the second four-way valve 272b are configured to change the passage of the refrigerant to the load side unit 3b based on the operation mode. The first four-way valve 271a is connected to the pipe 201, a pipe 202, and a gas branch pipe 43a, and the remaining port is blocked. The second four-way valve 272a is connected to a pipe 203a, a pipe 204a, and a liquid branch pipe 44a, and the remaining port is blocked. When the load side unit 3a is in cooling operation, the first four-way valve 271a is set by the controller 17 so that the gas branch pipe 43a and the pipe 202 are in communication and the pipe 201 is blocked. When the load side unit 3a is in heating operation, the first four-way valve 271a is set by the controller 17 so that the pipe 201 and the gas branch pipe 43a are in communication and the pipe 202 is blocked. When the load side unit 3a is in cooling operation, the second four-way valve 272a is set so that the pipe 203a and the liquid branch pipe 44a are in communication and the pipe 204a is blocked. When the load side unit 3a is in heating operation, the second four-way valve 272a is set so that the liquid branch pipe 44a and the pipe 204a are in communication and the pipe 203a is blocked.

The first four-way valve 271b is connected to the pipe 201, the pipe 202, and the gas branch pipe 43b, and the remaining port is blocked. The second four-way valve 272b is connected to a pipe 203b, a pipe 204b, and a liquid branch pipe 44b, and the remaining port is blocked. When the load side unit 3b is in cooling operation, the first four-way valve 271b is set so that the gas branch pipe 43b and the pipe 202 are in communication and the pipe 201 is blocked. When the load side unit 3b is in heating operation, the first four-way valve 271b is set so that the pipe 201 and the gas branch pipe 43b are in communication and the pipe 202 is blocked. When the load side unit 3b is in cooling operation, the second four-way valve 272b is set so that the pipe 203b and the liquid branch pipe 44b are in communication and the pipe 204b is blocked. When the load side unit 3b is in heating operation, the second four-way valve 272b is set so that the liquid branch pipe 44b and the pipe 204b are in communication and the pipe 203b is blocked.

The configuration, function, and position of the first expansion device 22 are the same as those in Embodiment 1. The configuration and function of the second expansion device 23 are the same as those in Embodiment 1. In Embodiment 2, the second expansion device 23 is disposed between the secondary side of the second refrigerant heat exchanger 25 and the second four-way valves 272a and 272b. The configurations, functions, and positions of the first refrigerant heat exchanger 24 and the second refrigerant heat exchanger 25 are the same as those in Embodiment 1, (Operation of Refrigeration Cycle Apparatus)

Next, operation of the refrigeration cycle apparatus 100A will be described. As in Embodiment 1, the refrigeration cycle apparatus 100A is configured to operate in one of the four modes, which are the cooling only operation mode, the cooling main operation mode, the heating only operation mode, and the heating main operation mode. For example, the controller 17 of the refrigeration cycle apparatus 100A is configured to receive an instruction for cooling operation or heating operation of the load side units 3a and 3b from devices such as remote controllers assigned one each to the load side units 3a and 3b. The controller 17 is configured to cause the refrigeration cycle apparatus 100A to operate in one of the four operation modes based on the received instruction.

(Cooling Only Operation Mode)

Figure 7:
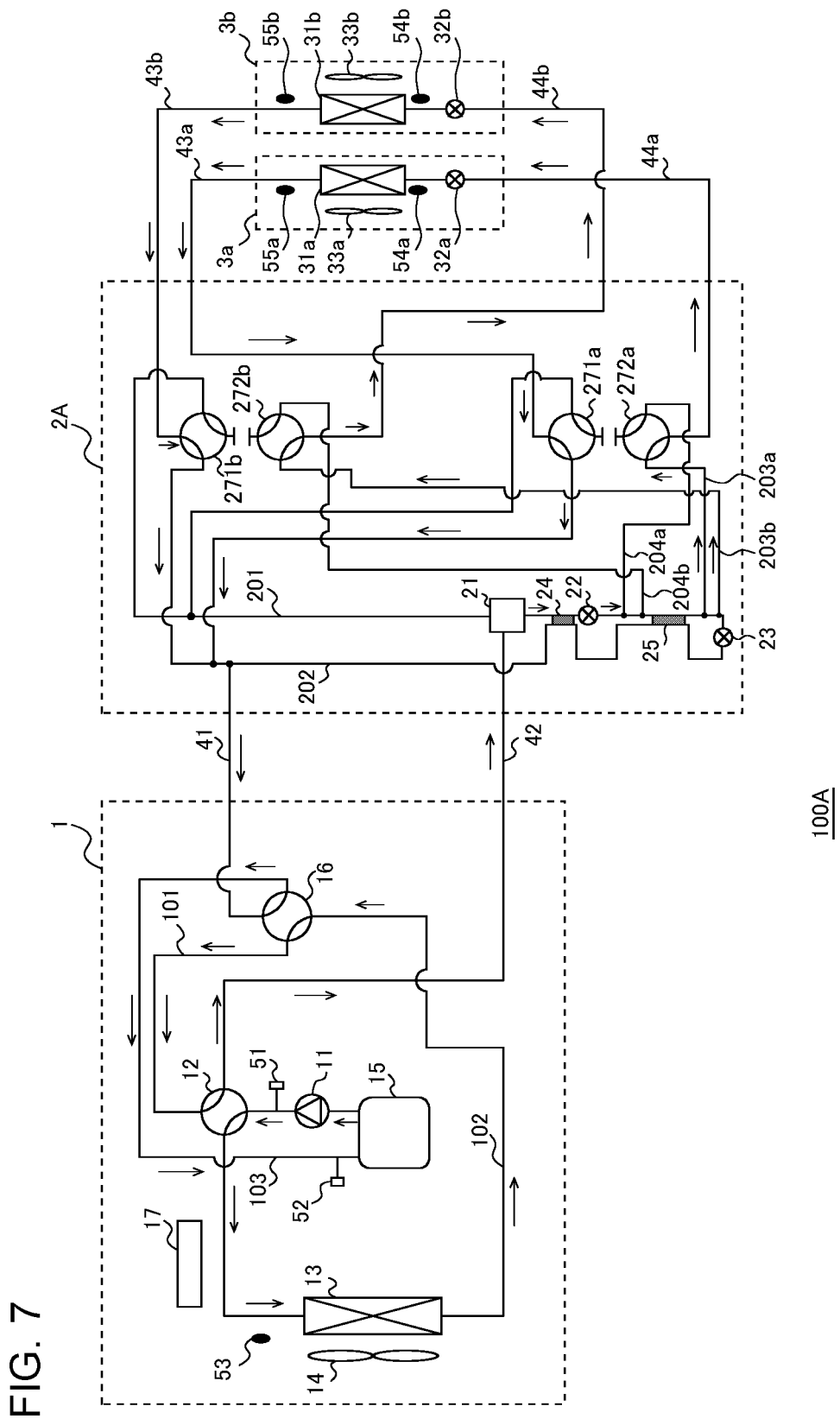
FIG. 7 illustrates the flow of refrigerant in the refrigeration cycle apparatus according to Embodiment 2, which is operating in the cooling only operation mode.

FIG. 7 illustrates the flow of refrigerant in the refrigeration cycle apparatus 100A according to Embodiment 2, which is operating in the cooling only operation mode. With reference to FIG. 7, description will be given with regard to the operation of the refrigeration cycle apparatus 100A, which is operating in the cooling only operation mode. In the cooling only operation mode, the first flow switching valve 12 and the second flow switching valve 16 are set in the same manner as those in the cooling only operation mode in Embodiment 1. In the cooling only operation mode, the first four-way valve 271a is set by the controller 17 so that the gas branch pipe 43a and the pipe 202 are in communication and the pipe 201 is blocked, and the second four-way valve 272a is set so that the pipe 203a and the liquid branch pipe 44a are in communication and the pipe 204a is blocked. Further, the first four-way valve 271b is set by the controller 17 so that the gas branch pipe 43b and the pipe 202 are in communication and the pipe 201 is blocked, and the second four-way valve 272b is set so that the pipe 203b and the liquid branch pipe 44b are in communication and the pipe 204b is blocked.

In the cooling only operation mode, the flow of refrigerant in the heat source side unit 1, the flow of refrigerant in the load side unit 3a, and the flow of refrigerant in the load side unit 3b are each the same as the corresponding flow of refrigerant in the cooling only operation mode in Embodiment 1. Thus, description will be given below with regard to the flow of refrigerant in the relay unit 2A.

The liquid refrigerant at high pressure flowing out of the heat source side unit 1 flows through the high-pressure pipe 42 into the gas-liquid separator 21 in the relay unit 2A. The liquid refrigerant flowing out of the liquid outlet of the gas-liquid separator 21 flows into the primary side of the first refrigerant heat exchanger 24. The liquid refrigerant flowing into the primary side of the first refrigerant heat exchanger 24 is cooled into a subcooled state by the refrigerant flowing on the secondary side of the first refrigerant heat exchanger 24. The pressure of the liquid refrigerant flowing out of the first refrigerant heat exchanger 24 is reduced to an intermediate pressure by the first expansion device 22. The liquid refrigerant whose pressure is reduced by the first expansion device 22 is further cooled by the second refrigerant heat exchanger 25, and the degree of subcooling of the liquid refrigerant increases. The liquid refrigerant flowing out of the second refrigerant heat exchanger 25 is branched into the flow to the pipe 203a, the flow to the pipe 203b, and the flow to the second expansion device 23. The refrigerant flowing into the pipe 203a flows through the second four-way valve 272a and the liquid branch pipe 44a, and flows out of the relay unit 2A into the load side unit 3a. The refrigerant flowing into the pipe 203b flows through the second four-way valve 272b and the liquid branch pipe 44b, and flows out of the relay unit 2 into the load side unit 3b.

The refrigerant exchanging heat in and flowing out of the load side unit 3a and the refrigerant exchanging heat in and flowing out of the load side unit 3b flow through the first four-way valve 271a and the first four-way valve 271b, respectively, merge in the pipe 202 with the refrigerant flowing through the secondary side of the first refrigerant heat exchanger 24 and the secondary side of the second refrigerant heat exchanger 25. The refrigerant merged in the pipe 202 flows through the low-pressure pipe 41 into the heat source side unit 1 and is suctioned again by the compressor 11 in the heat source side unit 1.

(Cooling Main Operation Mode)

Figure 8:
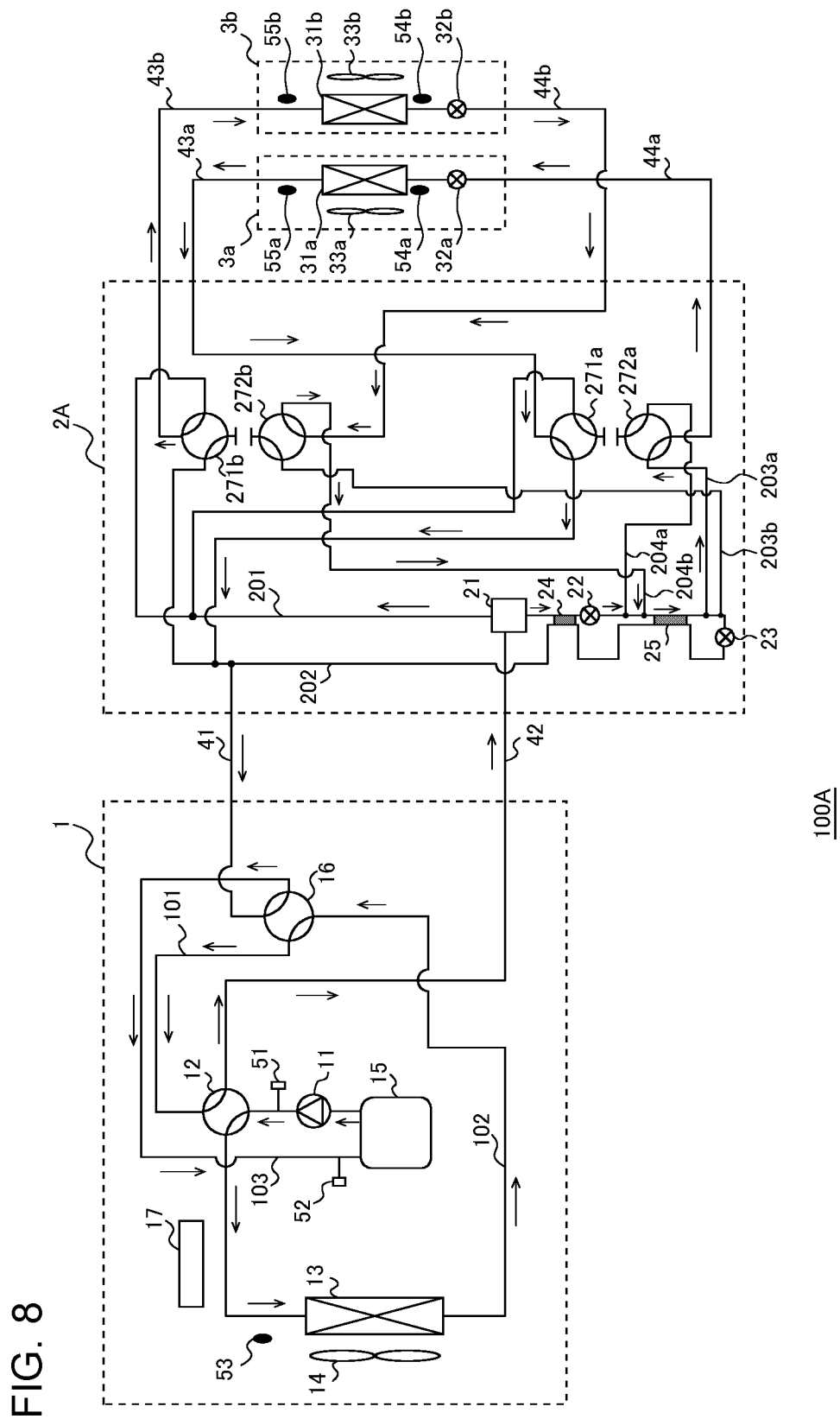
FIG. 8 illustrates the flow of refrigerant in the refrigeration cycle apparatus according to Embodiment 2, which is operating in the cooling main operation mode.

FIG. 8 illustrates the flow of refrigerant in the refrigeration cycle apparatus 100A according to Embodiment 2, which is operating in the cooling main operation mode. With reference to FIG. 8, description will be given with regard to the operation of the refrigeration cycle apparatus 100A, which is operating in the cooling main operation mode. In the following description of the cooling main operation mode, it is assumed that the load side unit 3*a* runs in cooling operation and the load side unit 3*b* runs in heating operation. In the cooling only operation mode, the first flow switching valve 12, the second flow switching valve 16, the first four-way valve 271*a*, and the second four-way valve 272*a* are set in the same manner as those in the cooling only operation mode. The first four-way valve 271*b* is set by the controller 17 so that the pipe 201 and the gas branch pipe 43*b* are in communication and the pipe 202 is blocked. The second four-way valve 272*b* is set by the controller 17 so that the liquid branch pipe 44*b* and the pipe 204*b* are in communication and the pipe 203*b* is blocked.

In the cooling main operation mode, the flow of refrigerant in the heat source side unit 1, the flow of refrigerant in the load side unit 3*a*, and the flow of refrigerant in the load side unit 3*b* are each the same as the corresponding flow of refrigerant in the cooling main operation mode in Embodiment 1. Thus, description will be given below with regard to the flow of refrigerant in the relay unit 2A.

The two-phase gas-liquid refrigerant flowing out of the heat source side unit 1 flows through the high-pressure pipe 42 into the gas-liquid separator 21 in the relay unit 2A. The two-phase gas-liquid refrigerant flowing into the gas-liquid separator 21 is separated into gas refrigerant and liquid refrigerant in the gas-liquid separator 21. The gas refrigerant flows out of the gas outlet of the gas-liquid separator 21 into the pipe 201. The gas refrigerant flowing into the pipe 201 flows through the first four-way valve 271*b* and the gas branch pipe 43*b* into the load side unit 3*b*.

The liquid refrigerant exchanging heat in and flowing out of the load side unit 3*b* flows through the liquid branch pipe 44*b* into the second four-way valve 272*b*. The liquid refrigerant flowing through the second four-way valve 272*b* and the pipe 204*b* merges with the liquid refrigerant that is subcooled after flowing through the first refrigerant heat exchanger 24 and the first expansion device 22 and flows into the second refrigerant heat exchanger 25. The liquid refrigerant flowing into the second refrigerant heat exchanger 25 is further cooled by heat exchange with the refrigerant flowing on the secondary side, and the degree of subcooling of the liquid refrigerant increases. The refrigerant flowing out of the second refrigerant heat exchanger 25 is branched into the flow to the pipe 203*a* and the flow to the second expansion device 23. The refrigerant flowing into the pipe 203*a* flows through the second four-way valve 272*a* and the liquid branch pipe 44*a*, and flows out of the relay unit 2A into the load side unit 3*a*.

The refrigerant exchanging heat in the load side unit 3*a* flows through the gas branch pipe 43*a*, and flows out of the load side unit 3*a* into the relay unit 2A. The refrigerant flowing into the relay unit 2A flows through the first four-way valve 271*a*, merges in the pipe 202 with the refrigerant flowing through the secondary side of the first refrigerant heat exchanger 24 and the secondary side of the second refrigerant heat exchanger 25, and flows into the low-pressure pipe 41. The refrigerant flowing through the low-pressure pipe 41 into the heat source side unit 1 is suctioned again by the compressor 11 in the heat source side unit 1.

(Heating Only Operation Mode)

Figure 9:
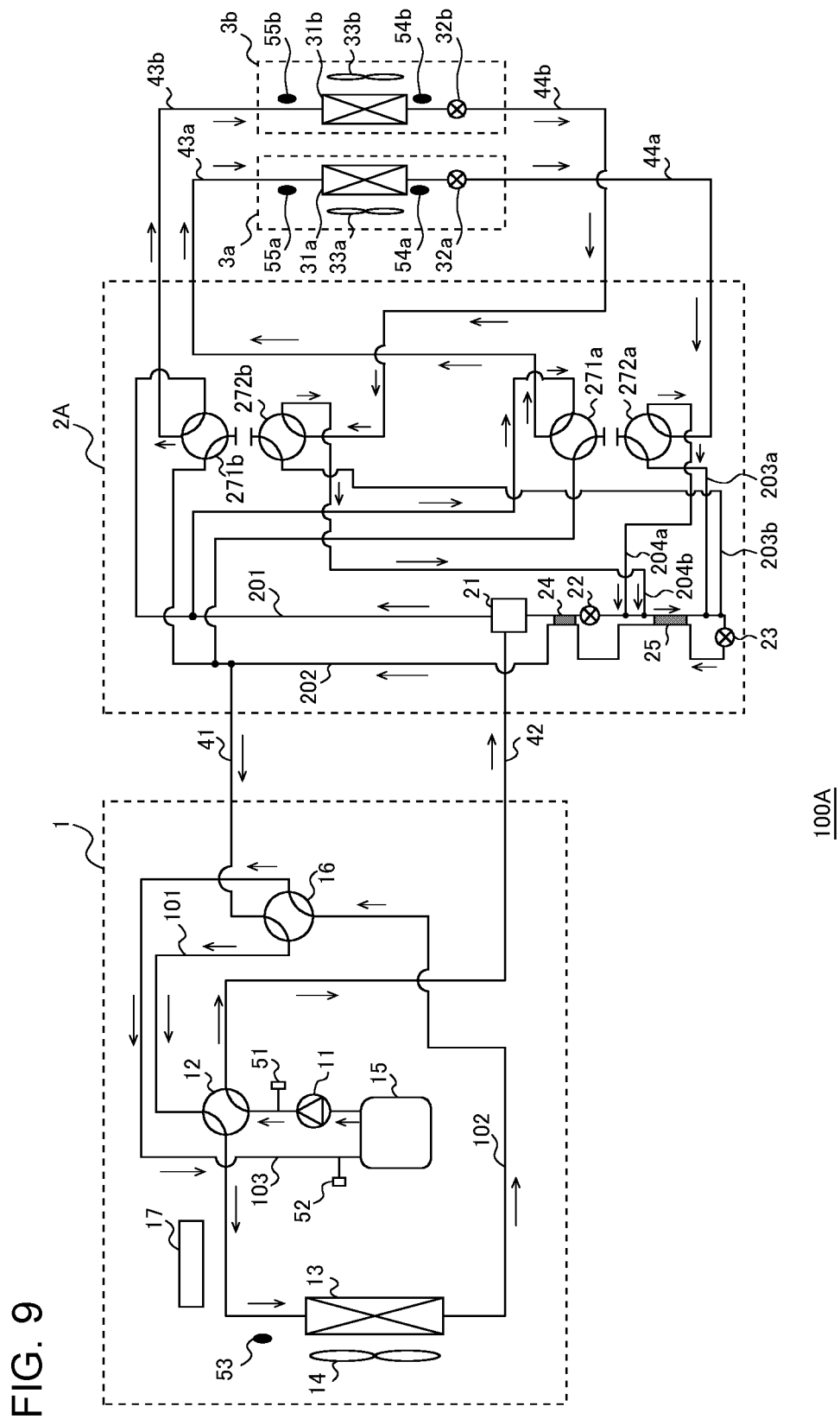
FIG. 9 illustrates the flow of refrigerant in the refrigeration cycle apparatus according to Embodiment 2, which is operating in the heating only operation mode.

FIG. 9 illustrates the flow of refrigerant in the refrigeration cycle apparatus 100A according to Embodiment 2, which is operating in the heating only operation mode. With reference to FIG. 9, description will be given with regard to the operation of the refrigeration cycle apparatus 100A, which is operating in the heating only operation mode. In the heating only operation mode, the first flow switching valve 12 and the second flow switching valve 16 are set in the same manner as those in the heating only operation mode in Embodiment 1. In the heating only operation mode, the first four-way valve 271*a* is set by the controller 17 so that the gas branch pipe 43*a* and the pipe 201 are in communication and the pipe 202 is blocked, and the second four-way valve 272*a* is set so that the pipe 204*a* and the liquid branch pipe 44*a* are in communication and the pipe 203*a* is blocked. Further, the first four-way valve 271*b* is set by the controller 17 so that the gas branch pipe 43*b* and the pipe 201 are in communication and the pipe 202 is blocked, and the second four-way valve 272*b* is set so that the pipe 204*b* and the liquid branch pipe 44*b* are in communication and the pipe 203*b* is blocked.

In the heating only operation mode, the flow of refrigerant in the heat source side unit 1, the flow of refrigerant in the load side unit 3*a*, and the flow of refrigerant in the load side unit 3*b* are each the same as the corresponding flow of refrigerant in the heating only operation mode in Embodiment 1. Thus, description will be given below with regard to the flow of refrigerant in the relay unit 2A.

The gas refrigerant at high temperature and high pressure flowing out of the heat source side unit 1 flows through the high-pressure pipe 42 into the gas-liquid separator 21 in the relay unit 2A. The refrigerant flowing out of the gas outlet of the gas-liquid separator 21 flows through the pipe 201 into the first four-way valves 271*a* and 271*b*. The gas refrigerant at high temperature and high pressure flowing through the first four-way valve 271*a* flows through the gas branch pipe 43*a* into the load side unit 3*a*, and the gas refrigerant at high temperature and high pressure flowing through the first four-way valve 271*b* flows through the gas branch pipe 43*b* into the load side unit 3*b*.

The refrigerant exchanging heat in and flowing out of the load side unit 3*a* through the liquid branch pipe 44*a* and the refrigerant exchanging heat in and flowing out of the load side unit 3*b* through the liquid branch pipe 44*b* flow into the relay unit 2A. The liquid refrigerant flowing into the relay unit 2A flows into the pipe between the first expansion device 22 and the second refrigerant heat exchanger 25 after flowing through the second four-way valves 272*a* and 272*b* and the pipes 204*a* and 204*b* and flows through the second refrigerant heat exchanger 25. The refrigerant flowing through the second refrigerant heat exchanger 25 flows through the second expansion device 23 and the pipe 202 into the low-pressure pipe 41. The refrigerant flowing through the low-pressure pipe 41 into the heat source side unit 1 is suctioned again by the compressor 11 in the heat source side unit 1.

(Heating Main Operation Mode)

Figure 10:
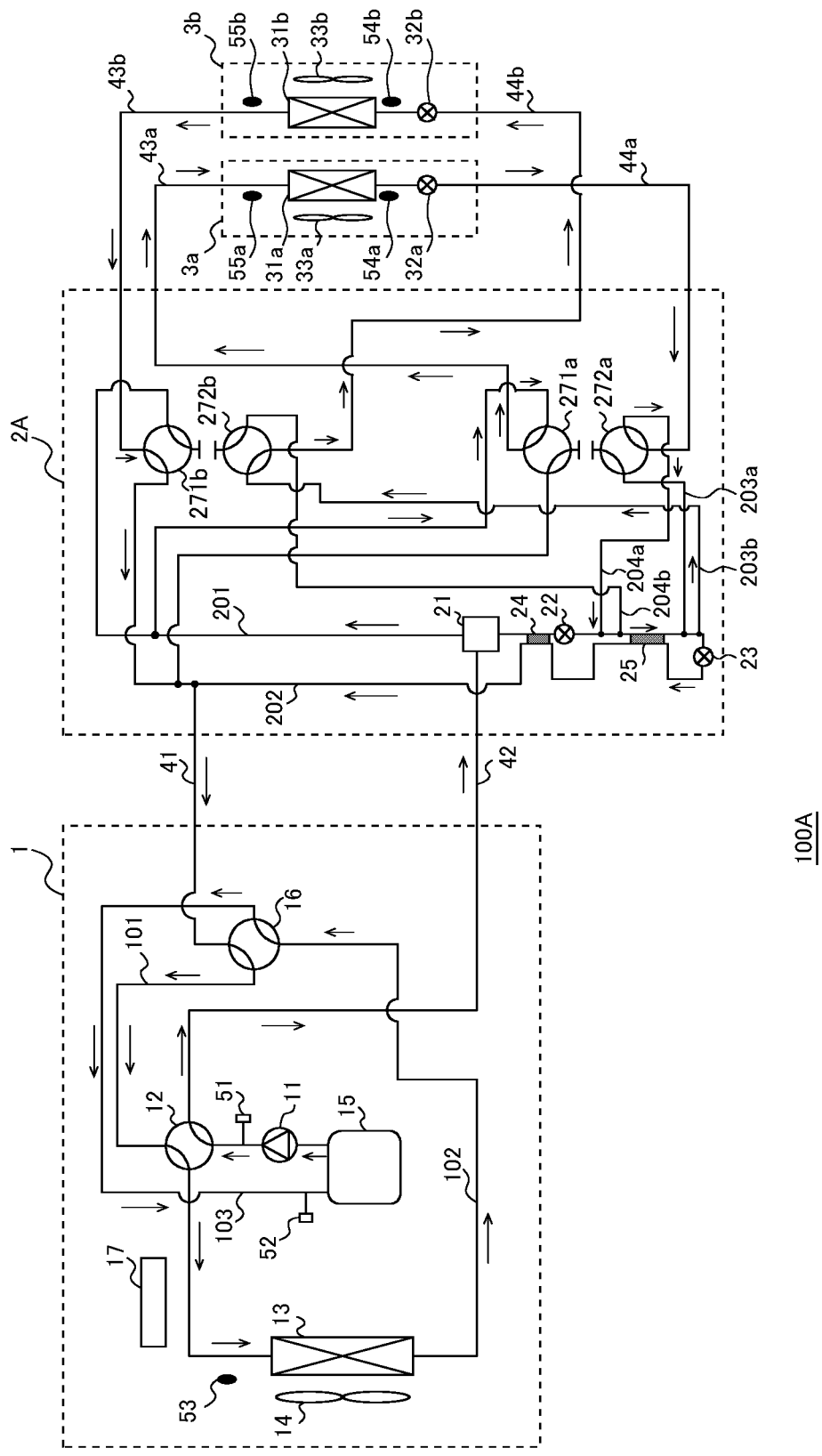
FIG. 10 illustrates the flow of refrigerant in the refrigeration cycle apparatus according to Embodiment 2, which is operating in the heating main operation mode.

FIG. 10 illustrates the flow of refrigerant in the refrigeration cycle apparatus 100A according to Embodiment 2, which is operating in the heating main operation mode. With reference to FIG. 10, description will be given with regard to the operation of the refrigeration cycle apparatus 100A, which is operating in the heating main operation mode. In the following description of the heating main operation mode, it is assumed that the load side unit 3a runs in heating operation and the load side unit 3b runs in cooling operation. In the heating main operation mode, the first flow switching valve 12, the second flow switching valve 16, the first four-way valve 271a, and the second four-way valve 272a are set in the same manner as those in the heating only operation mode. The first four-way valve 271b is set by the controller 17 so that the gas branch pipe 43b and the pipe 202 are in communication and the pipe 201 is blocked, and the second four-way valve 272b is set so that the pipe 203b and the liquid branch pipe 44b are in communication and the pipe 204b is blocked.

In the heating main operation mode, the flow of refrigerant in the heat source side unit 1, the flow of refrigerant in the load side unit 3a, and the flow of refrigerant in the load side unit 3b are each the same as the corresponding flow of refrigerant in the heating main operation mode in Embodiment 1. Thus, description will be given below with regard to the flow of refrigerant in the relay unit 2A.

The gas refrigerant at high temperature and high pressure flowing out of the heat source side unit 1 flows through the high-pressure pipe 42 into the gas-liquid separator 21 in the relay unit 2A. The refrigerant flowing out of the gas outlet of the gas-liquid separator 21 flows through the pipe 201 into the first four-way valve 271a. The gas refrigerant at high temperature and high pressure that flows through the first four-way valve 271a flows through the gas branch pipe 43a into the load side unit 3a.

The liquid refrigerant exchanging heat in and flowing out of the load side unit 3a flows through the liquid branch pipe 44a into the relay unit 2A. The liquid refrigerant flowing into the relay unit 2A flows through the second four-way valve 272a and the pipe 204a into the primary side of the second refrigerant heat exchanger 25. The refrigerant flowing into the second refrigerant heat exchanger 25 is cooled into a subcooled state by heat exchange with the refrigerant flowing on the secondary side and flows out of the second refrigerant heat exchanger 25. The liquid refrigerant flowing out of the second refrigerant heat exchanger 25 is branched into the flow to the pipe 203b and the flow to the second expansion device 23. The refrigerant flowing into the pipe 203b flows through the second four-way valve 272b and the liquid branch pipe 44b, and flows out of the relay unit 2A into the load side unit 3b.

The refrigerant exchanging heat in and flowing out of the load side unit 3b flows through the gas branch pipe 43b into the relay unit 2A. The refrigerant flowing into the relay unit 2A flows through the first four-way valve 271b, merges in the pipe 202 with the refrigerant flowing through the secondary side of the first refrigerant heat exchanger 24 and the secondary side of the second refrigerant heat exchanger 25, and flows into the low-pressure pipe 41. The refrigerant flowing through the low-pressure pipe 41 into the heat source side unit 1 is suctioned again by the compressor 11 in the heat source side unit 1.

As described above, since the passages of refrigerant are changed by the second flow switching valve 16 and the pairs of four-way valves installed one each for the load side units, the refrigeration cycle apparatus 100A according to Embodiment 2 can achieve the same advantageous effect as described in Embodiment 1. In addition, using four-way valves, which are widely used in the art, enables further cost reduction.

Embodiment 3

(Configuration of Refrigeration Cycle Apparatus)

Figure 11:
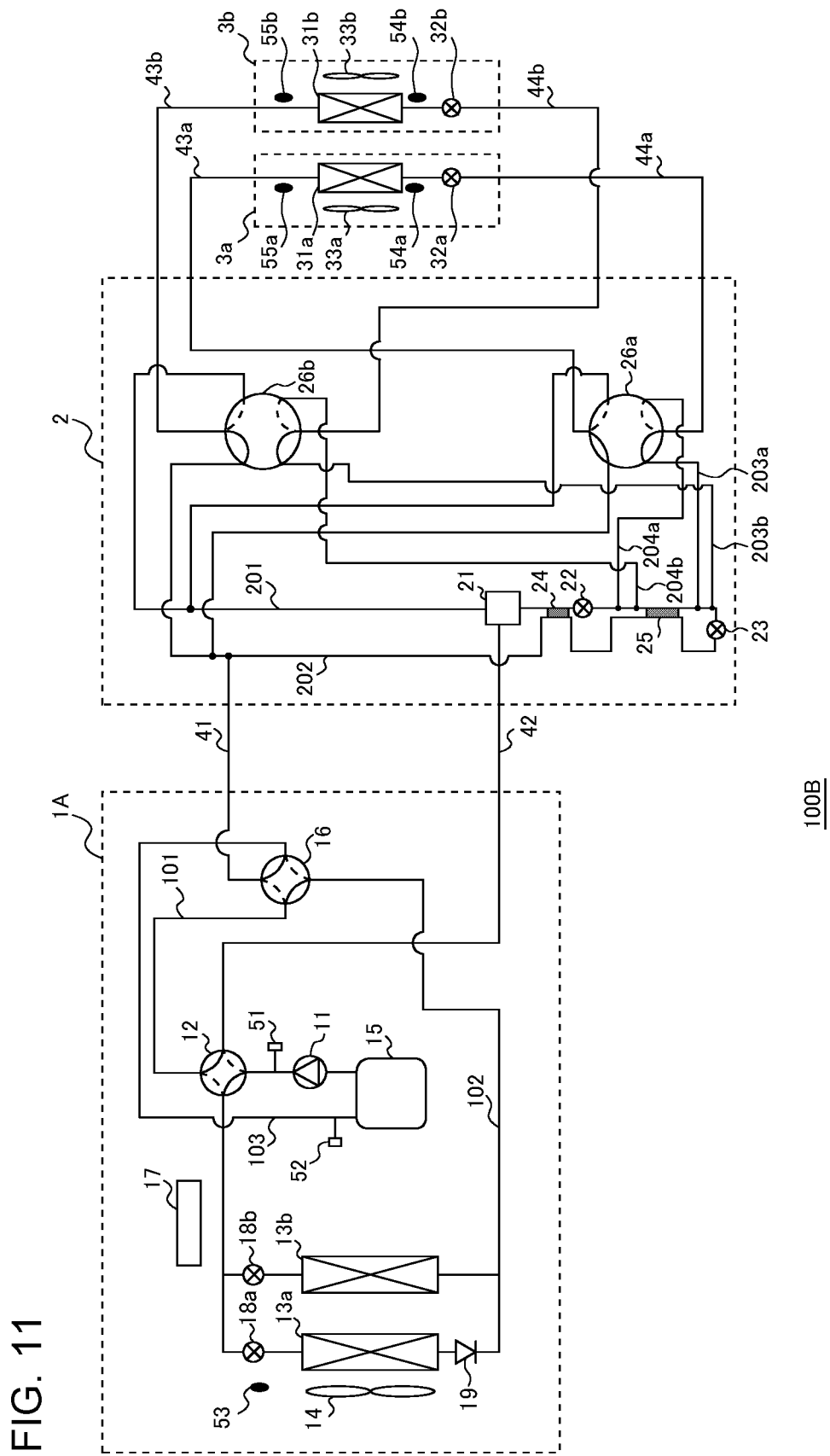
FIG. 11 is a refrigerant circuit diagram of a refrigeration cycle apparatus according to Embodiment 3.

FIG. 11 is a refrigerant circuit diagram of a refrigeration cycle apparatus 1008 according to Embodiment 3. The refrigeration cycle apparatus 100B in Embodiment 3 differs in the configuration of a heat source side unit 1A from the refrigeration cycle apparatus 100 in Embodiment 1. The configurations of the relay unit 2 and the load side units 3a and 3b in the refrigeration cycle apparatus 100B are the same as the configurations of those in Embodiment 1.

(Heat Source Side Unit)

The heat source side unit 1A includes a compressor 11, a first flow switching valve 12, a first heat source side heat exchanger 13a, a second heat source side heat exchanger 13b, a heat source side fan 14, an accumulator 15, a second flow switching valve 16, a controller 17, a first heat source side expansion device 18a, a second heat source side expansion device 18b, and a check valve 19.

The configurations, functions, and positions of the compressor 11, the accumulator 15, and the controller 17 are the same as those in Embodiment 1. The configuration and function of the first flow switching valve 12 are the same as those in Embodiment 1. The first flow switching valve 12 is connected to the discharge side of the compressor 11, the first heat source side heat exchanger 13a and the second heat source side heat exchanger 13b, the second flow switching valve 16, and the high-pressure pipe 42.

The configuration of the heat source side fan 14 is the same as that in Embodiment 1. The heat source side fan 14 is configured to supply the first heat source side heat exchanger 13a and the second heat source side heat exchanger 13b with air. The heat source side unit 1A may include two heat source side fans 14 one each for the first heat source side heat exchanger 13a and the second heat source side heat exchanger 13b, and air may be supplied separately.

The configuration and function of the second flow switching valve 16 are the same as those in Embodiment 1. The second flow switching valve 16 is connected to the first flow switching valve 12 by using a pipe 101 and connected to the first heat source side heat exchanger 13a and the second heat source side heat exchanger 13b by using a pipe 102.

The first heat source side heat exchanger 13a is, for example, a heat exchanger of a fin-tube type. The first heat source side heat exchanger 13a is configured to exchange heat between the air supplied by the heat source side fan 14 and refrigerant. The first heat source side heat exchanger 13a is configured to function as an evaporator or a condenser based on the operation mode and evaporate or condense refrigerant.

The second heat source side heat exchanger 13b is, for example, a heat exchanger of a fin-tube type. The second heat source side heat exchanger 13b is configured to exchange heat between the air supplied by the heat source side fan 14 and refrigerant. The second heat source side heat exchanger 13b is configured to function as an evaporator or a condenser based on the operation mode and evaporate or condense refrigerant. The first heat source side heat exchanger 13a and the second heat source side heat exchanger 13b are connected in parallel.

The first heat source side expansion device 18a is an electronic expansion valve whose opening degree is variably controlled. The first heat source side expansion device 18a is disposed at one end of the first heat source side heat exchanger 13a and configured to allow or stop the flow of refrigerant in the first heat source side heat exchanger 13a. The first heat source side expansion device 18a may be a solenoid valve.

The second heat source side expansion device 18b is an electronic expansion valve whose opening degree is variably controlled. The second heat source side expansion device 18b is disposed at one end of the second heat source side heat exchanger 13b and configured to allow or stop the flow of refrigerant in the second heat source side heat exchanger 13b. The second heat source side expansion device 18b may be a solenoid valve.

The check valve 19 is disposed between the other end of the first heat source side heat exchanger 13a and the second flow switching valve 16. The check valve 19 is configured to allow refrigerant to flow from the first heat source side heat exchanger 13a to the second flow switching valve 16 and stop refrigerant from flowing from the second flow switching valve 16 to the first heat source side heat exchanger 13a.

(Operation of Refrigeration Cycle Apparatus)

Next, operation of the refrigeration cycle apparatus 100B will be described. As in Embodiment 1, the refrigeration cycle apparatus 100B is configured to operate in one of the four modes, which are the cooling only operation mode, the cooling main operation mode, the heating only operation mode, and the heating main operation mode. For example, the controller 17 of the refrigeration cycle apparatus 100B is configured to receive an instruction for cooling operation or heating operation of the load side units 3a and 3b from devices such as remote controllers assigned one each to the load side units 3a and 3b. The controller 17 is configured to cause the refrigeration cycle apparatus 100B to operate in one of the four operation modes based on the received instruction.

(Cooling Only Operation Mode)

Figure 12:
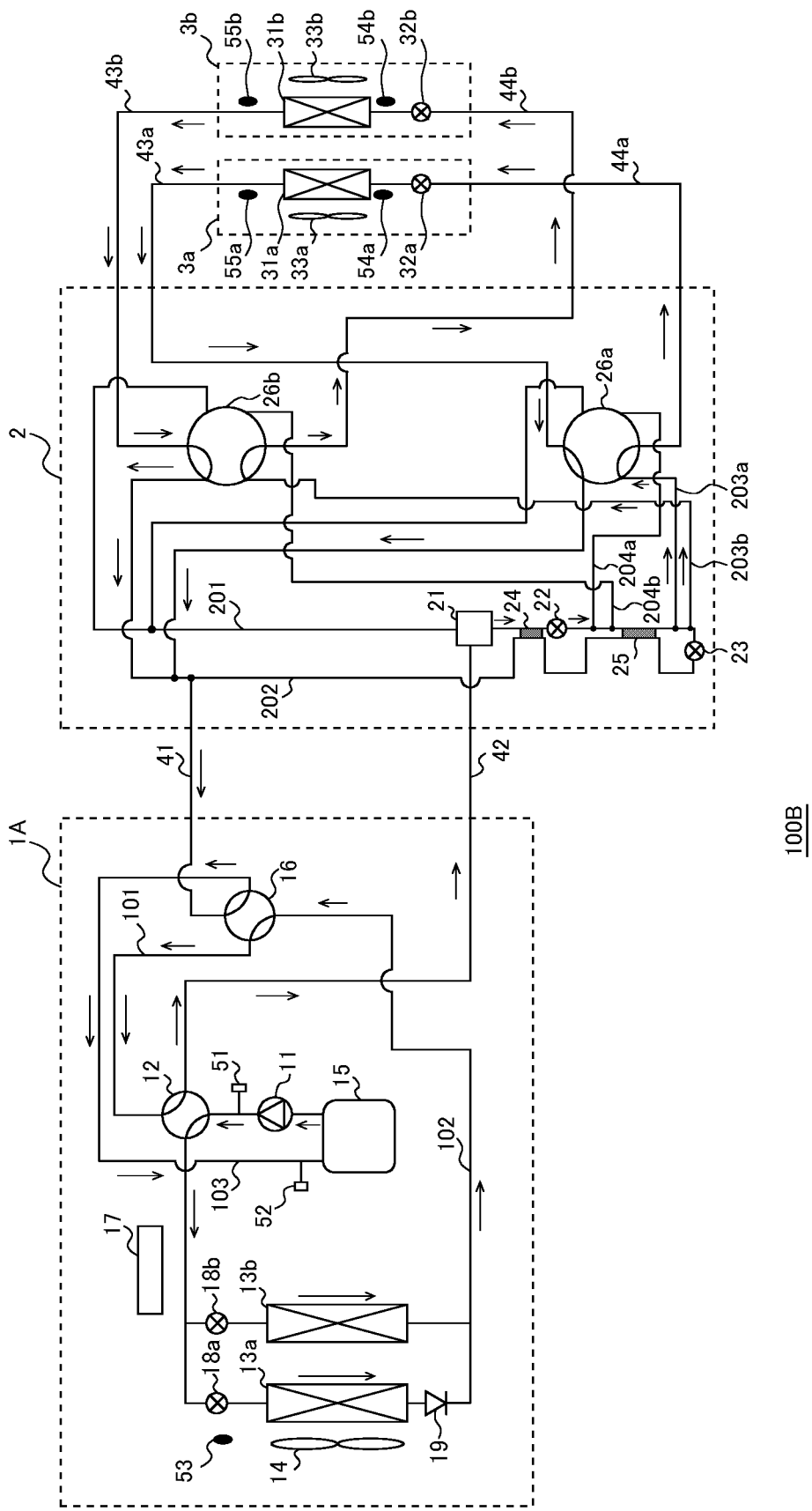
FIG. 12 illustrates the flow of refrigerant in the refrigeration cycle apparatus according to Embodiment 3, which is operating in the cooling only operation mode.

FIG. 12 illustrates the flow of refrigerant in the refrigeration cycle apparatus 100B according to Embodiment 3, which is operating in the cooling only operation mode. With reference to FIG. 12, description will be given with regard to the operation of the refrigeration cycle apparatus 100B, which is operating in the cooling only operation mode. In the cooling only operation mode, the first flow switching valve 12, the second flow switching valve 16, and the six-way valves 26a and 26b are set in the same manner as those in the cooling only operation mode in Embodiment 1. In the cooling only operation mode, both the first heat source side expansion device 18a and the second heat source side expansion device 18b are fully opened by the controller 17 to increase the amount of heat exchange in the heat source side unit 1A. In this configuration, refrigerant flows in both the first heat source side heat exchanger 13a and the second heat source side heat exchanger 13b, and heat is exchanged.

In the cooling only operation mode, the flow of refrigerant in the relay unit 2, the flow of refrigerant in the load side unit 3a, and the flow of refrigerant in the load side unit 3b are each the same as the corresponding flow of refrigerant in the cooling only operation mode in Embodiment 1. Thus, description will be given below with regard to the flow of refrigerant in the heat source side unit 1A.

The compressor 11 compresses refrigerant at low temperature and low pressure and discharges gas refrigerant at high temperature and high pressure. The gas refrigerant at high temperature and high pressure discharged from the compressor 11 flows through the first flow switching valve 12 and flows into both the first heat source side heat exchanger 13a and the second heat source side heat exchanger 13b. The refrigerant flowing into the first heat source side heat exchanger 13a and the refrigerant flowing into the second heat source side heat exchanger 13b exchange heat with the air supplied by the heat source side fan 14 and condense and liquefy. The liquid refrigerant flowing out of the first heat source side heat exchanger 13a and the second heat source side heat exchanger 13b flows through the second flow switching valve 16, the first flow switching valve 12, and the high-pressure pipe 42 and flows out of the heat source side unit 1A. The refrigerant flowing out of the heat source side unit 1A flows through the relay unit 2, the load side units 3a and 3b, and the relay unit 2 in this order. Then, the refrigerant flows through the low-pressure pipe 41 into the heat source side unit 1A, and the refrigerant is suctioned again by the compressor 11 in the heat source side unit 1A.

(Cooling Main Operation Mode)

Figure 13:
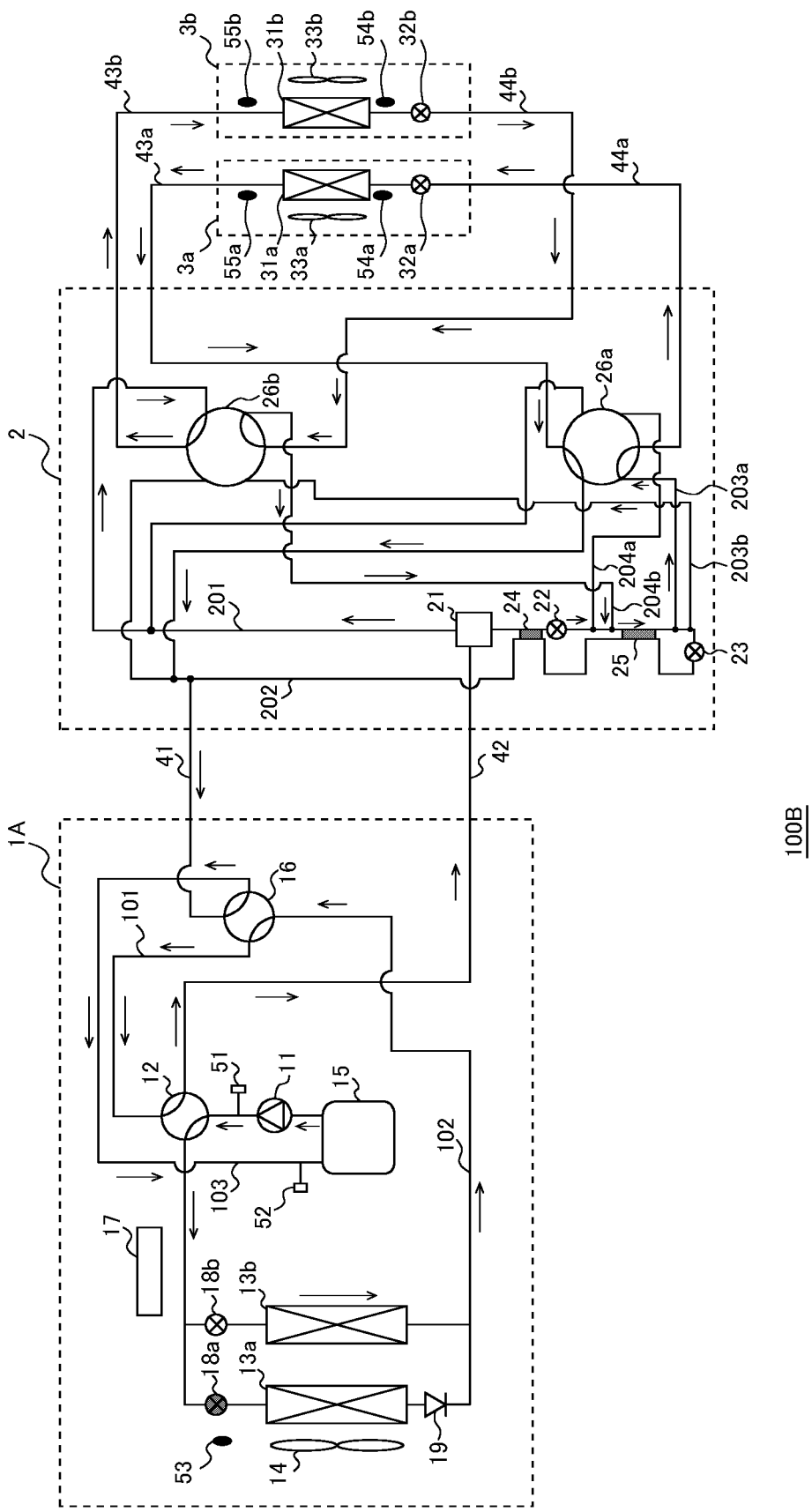
FIG. 13 illustrates the flow of refrigerant in the refrigeration cycle apparatus according to Embodiment 3, which is operating in the cooling main operation mode.

FIG. 13 illustrates the flow of refrigerant in the refrigeration cycle apparatus 100B according to Embodiment 3, which is operating in the cooling main operation mode. With reference to FIG. 13, description will be given with regard to the operation of the refrigeration cycle apparatus 100B, which is operating in the cooling main operation mode. In the following description of the cooling main operation mode, it is assumed that the load side unit 3a runs in cooling operation and the load side unit 3b runs in heating operation. In the cooling main operation mode, the first flow switching valve 12, the second flow switching valve 16, and the six-way valves 26a and 26b are set in the same manner as those in the cooling main operation mode in Embodiment 1. In the cooling main operation mode, the first heat source side expansion device 18a is fully closed, and the second heat source side expansion device 18b is fully opened by the controller 17. In this configuration, refrigerant stops flowing in the first heat source side heat exchanger 13a and the amount of heat exchange in the heat source side unit 1A is reduced.

In the cooling main operation mode, the flow of refrigerant in the relay unit 2, the flow of refrigerant in the load side unit 3a, and the flow of refrigerant in the load side unit 3b are each the same as the corresponding flow of refrigerant in the cooling main operation mode in Embodiment 1. Thus, description will be given below with regard to the flow of refrigerant in the heat source side unit 1A.

The compressor 11 compresses refrigerant at low temperature and low pressure and discharges gas refrigerant at high temperature and high pressure. The gas refrigerant at high temperature and high pressure discharged from the compressor 11 flows through the first flow switching valve 12 and flows into the second heat source side heat exchanger 13b only. The refrigerant flowing into the second heat source side heat exchanger 13b exchanges heat with the air supplied by the heat source side fan 14 and condenses and liquefies. The refrigerant flowing out of the second heat source side heat exchanger 13b flows through the second flow switching valve 16, the first flow switching valve 12, and the high-pressure pipe 42 and flows out of the heat source side unit 1A. Since the check valve 19 is disposed at the outlet of refrigerant of the first heat source side heat exchanger 13a, the refrigerant does not flow into the first heat source side heat exchanger 13a after flowing through the second heat source side heat exchanger 13b. The refrigerant flowing out of the heat source side unit 1A flows through the relay unit 2, the load side units 3a and 3b, and the relay unit 2 in this order. Then, the refrigerant flows through the low-pressure pipe 41 into the heat source side unit 1A, and the refrigerant is suctioned again by the compressor 11 in the heat source side unit 1A.

(Heating Only Operation Mode)

Figure 14:
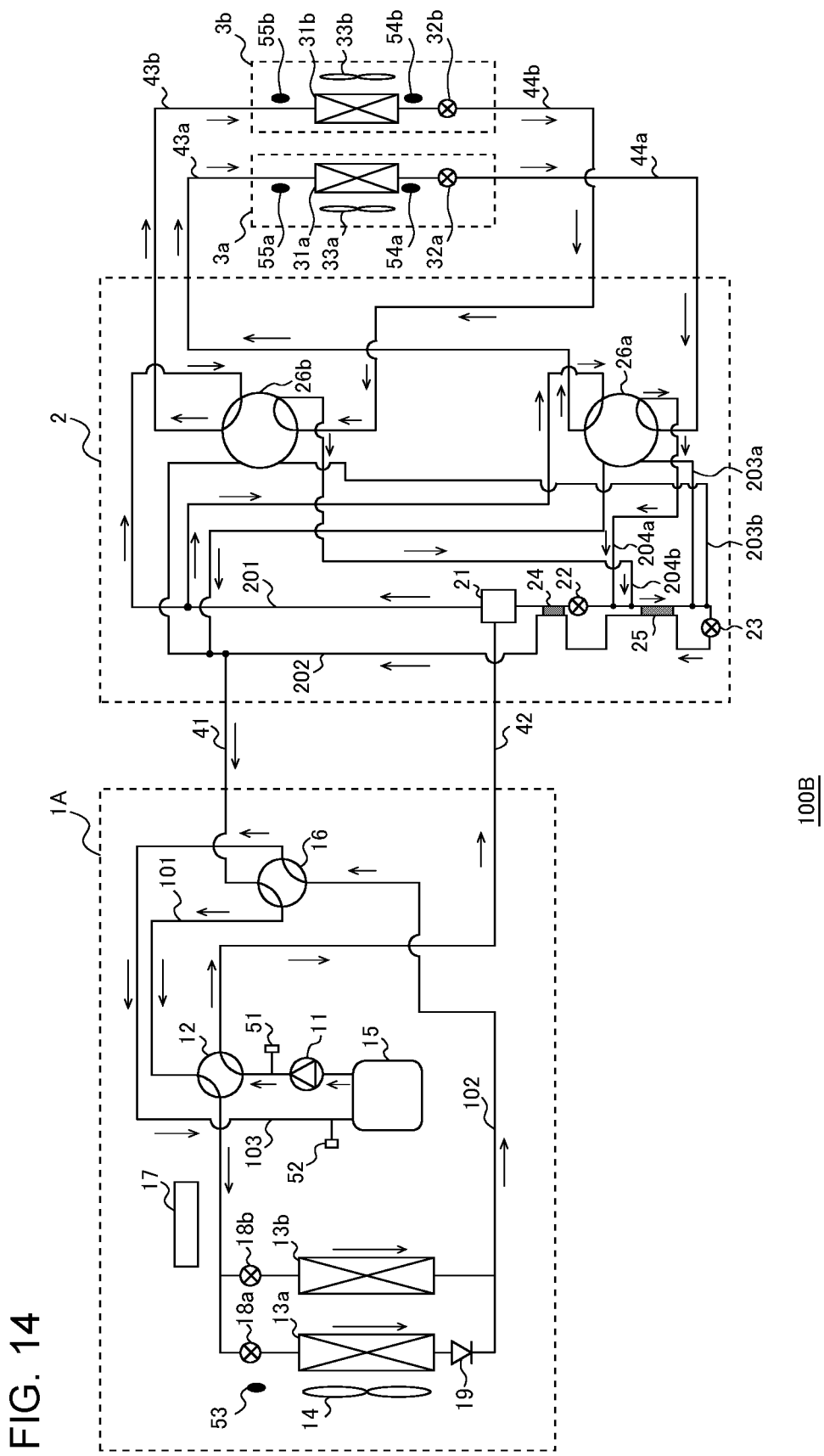
FIG. 14 illustrates the flow of refrigerant in the refrigeration cycle apparatus according to Embodiment 3, which is operating in the heating only operation mode.

FIG. 14 illustrates the flow of refrigerant in the refrigeration cycle apparatus 100B according to Embodiment 3, which is operating in the heating only operation mode. With reference to FIG. 14, description will be given with regard to the operation of the refrigeration cycle apparatus 100B, which is operating in the heating only operation mode. In the heating only operation mode, the first flow switching valve 12, the second flow switching valve 16, and the six-way valves 26a and 26b are set in the same manner as those in the heating only operation mode in Embodiment 1. In the heating only operation mode, both the first heat source side expansion device 18a and the second heat source side expansion device 18b are fully opened by the controller 17 to increase the amount of heat exchange in the heat source side unit 1A. In this configuration, refrigerant flows in both the first heat source side heat exchanger 13a and the second heat source side heat exchanger 13b, and heat is exchanged.

The compressor 11 compresses refrigerant at low temperature and low pressure and discharges gas refrigerant at high temperature and high pressure. The gas refrigerant at high temperature and high pressure discharged from the compressor 11 flows through the first flow switching valve 12 and flows into the high-pressure pipe 42. The refrigerant flowing into the high-pressure pipe 42 flows out of the heat source side unit 1A. The refrigerant flowing out of the heat source side unit 1A flows through the relay unit 2, the load side units 3a and 3b, and the relay unit 2 in this order, then flows through the low-pressure pipe 41 into the heat source side unit 1A.

The refrigerant flowing into the heat source side unit 1A flows through the second flow switching valve 16 and the first flow switching valve 12 and flows into both the first heat source side heat exchanger 13a and the second heat source side heat exchanger 13b. The refrigerant flowing into the first heat source side heat exchanger 13a and the refrigerant flowing into the second heat source side heat exchanger 13b exchange heat with the air supplied by the heat source side fan 14 and evaporate and gasify. The refrigerant flowing out of the first heat source side heat exchanger 13a and the second heat source side heat exchanger 13b flows through the second flow switching valve 16 and the accumulator 15 and is suctioned again by the compressor 11.

(Heating Main Operation Mode)

Figure 15:
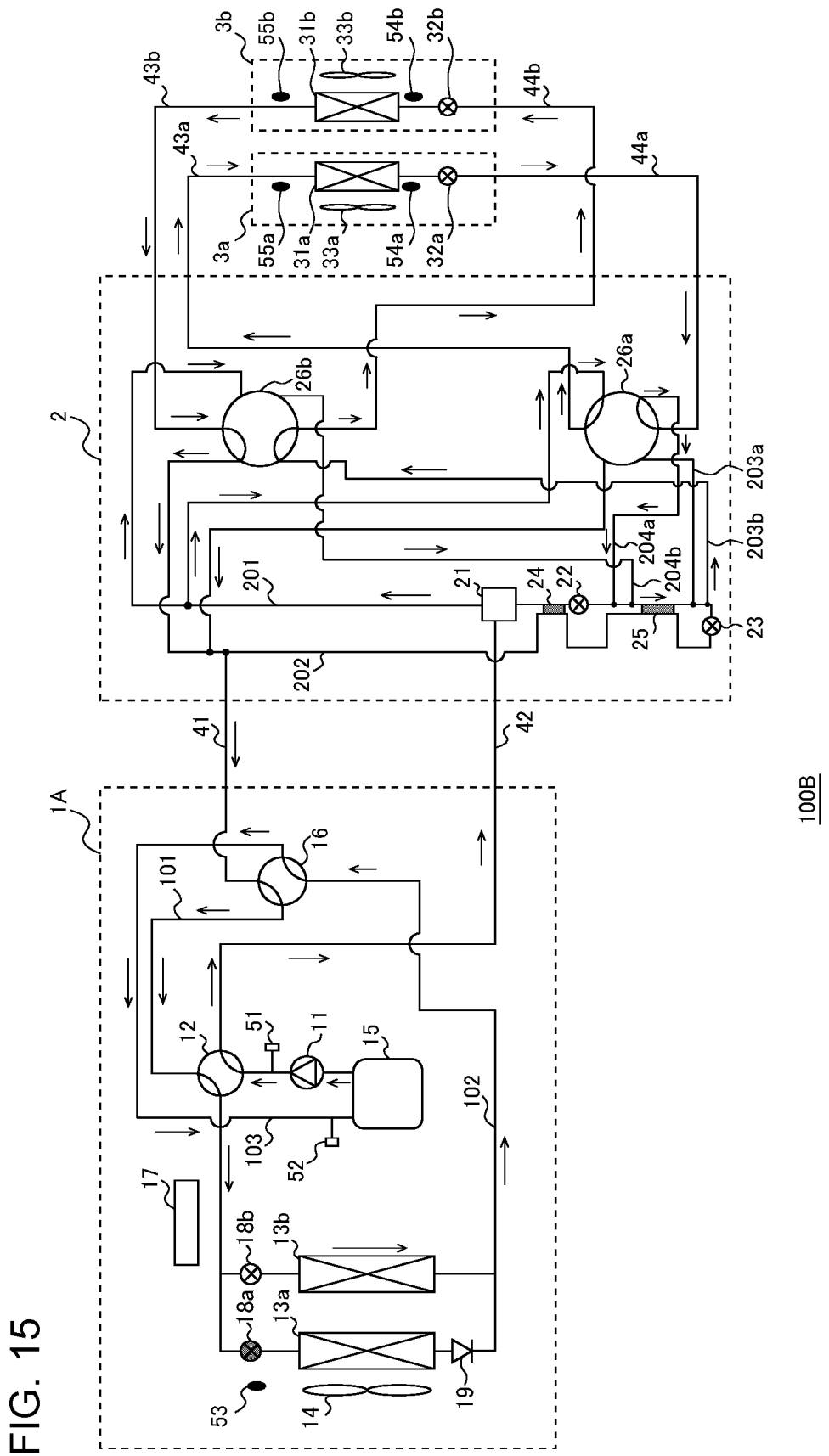
FIG. 15 illustrates the flow of refrigerant in the refrigeration cycle apparatus according to Embodiment 3, which is operating in the heating main operation mode.

FIG. 15 illustrates the flow of refrigerant in the refrigeration cycle apparatus 100B according to Embodiment 3, which is operating in the heating main operation mode. With reference to FIG. 15, description will be given with regard to the operation of the refrigeration cycle apparatus 100B, which is operating in the heating main operation mode. In the following description of the heating main operation mode, it is assumed that the load side unit 3a runs in heating operation and the load side unit 3b runs in cooling operation. In the heating main operation mode, the first flow switching valve 12, the second flow switching valve 16, and the six-way valves 26a and 26b are set in the same manner as those in the heating main operation mode in Embodiment 1. In the heating main operation mode, the first heat source side expansion device 18a is fully closed, and the second heat source side expansion device 18b is fully opened by the controller 17. In this configuration, refrigerant stops flowing in the first heat source side heat exchanger 13a and the amount of heat exchange in the heat source side unit 1A is reduced.

The compressor 11 compresses refrigerant at low temperature and low pressure and discharges gas refrigerant at high temperature and high pressure. The gas refrigerant at high temperature and high pressure discharged from the compressor 11 flows through the first flow switching valve 12 and flows into the high-pressure pipe 42. The refrigerant flowing into the high-pressure pipe 42 flows out of the heat source side unit 1A. The refrigerant flowing out of the heat source side unit 1A flows through the relay unit 2, the load side units 3a and 3b, and the relay unit 2 in this order, then flows through the low-pressure pipe 41 into the heat source side unit 1A.

The refrigerant flowing into the heat source side unit 1A flows through the second flow switching valve 16 and the first flow switching valve 12 and flows into the second heat source side heat exchanger 13b only. The refrigerant flowing into the second heat source side heat exchanger 13b exchanges heat with the air supplied by the heat source side fan 14 and condenses and gasifies. The refrigerant flowing out of the second heat source side heat exchanger 13b flows through the second flow switching valve 16 and the accumulator 15 and is suctioned again by the compressor 11. Since the check valve 19 is disposed at the outlet of refrigerant of the first heat source side heat exchanger 13a, the refrigerant does not flow into the first heat source side heat exchanger 13a after flowing through the second heat source side heat exchanger 13b.

As described above, the refrigeration cycle apparatus 100B in Embodiment 3 not only can achieve the advantageous effect described in Embodiment 1 but also can adjust the amount of heat exchange in the heat source side unit 1A depending on the amount of a cooling load and a heating load in the air-conditioning target space for which the refrigeration cycle apparatus 100B operates. Specifically, refrigerant is condensed or evaporated in both the first heat source side heat exchanger 13a and the second heat source side heat exchanger 13b in the cooling only operation mode for a heavy cooling load or in the heating only operation mode for a heavy heating load. This configuration can maximize the condensing capacity and the evaporating capacity in the heat source side unit 1A.

In addition, since refrigerant is condensed only in the second heat source side heat exchanger 13b in the cooling main operation mode, the condensing capacity can be reduced, and the condensing temperature of the second heat source side heat exchanger 13b increases. As the condensing temperature of the second heat source side heat exchanger 13b increases, the condensing temperature of the load side heat exchanger 31b running in heating operation also increases, increasing the heating capability of the load side unit 3b.

Further, since refrigerant is evaporated only in the second heat source side heat exchanger 13b in the heating main operation mode, the evaporating capacity can be reduced, and the evaporating temperature of the second heat source side heat exchanger 13b decreases. As the evaporating temperature of the second heat source side heat exchanger 13b decreases, the evaporating temperature of the load side heat exchanger 31b running in cooling operation also decreases, increasing the cooling capability of the load side unit 3b.

Further, since the check valve 19 is disposed, refrigerant does not accumulate in the first heat source side heat exchanger 13a, and the refrigerant in the refrigerant circuit does not run short. In addition, since refrigerant always flows in one direction in the first heat source side heat exchanger 13a and the second heat source side heat exchanger 13b, the pressure of the refrigerant can always be reduced upstream of the first heat source side heat exchanger 13a and the second heat source side heat exchanger 13b. In this configuration, the accumulation of refrigerant in the first heat source side heat exchanger 13a and the second heat source side heat exchanger 13b can be avoided.

In the above description, it is assumed that both the first heat source side heat exchanger 13a and the second heat source side heat exchanger 13b exchange heat in the cooling only operation mode and the heating only operation mode and only the second heat source side heat exchanger 13b exchanges heat in the cooling main operation mode and the heating main operation mode, however, the configuration of the embodiments is not limited thereto. For example, only the second heat source side heat exchanger 13b may exchange heat in the cooling only operation mode and the heating only operation mode, and both the first heat source side heat exchanger 13a and the second heat source side heat exchanger 13b may exchange heat in the cooling main operation mode and the heating main operation mode. Regardless of the operation mode, the controller 17 may control the first heat source side expansion device 18a and the second heat source side expansion device 18b depending on a cooling load and a heating load in the air-conditioning target space for which the refrigeration cycle apparatus 100B operates. The controller 17 may also adjust the amount of heat exchange by increasing or decreasing the rotation speed of the heat source side fan 14 depending on a cooling load and a heating load in the air-conditioning target space for which the refrigeration cycle apparatus 100B operates.

The embodiments have been described as above, but the present disclosure is not limited to the embodiments described above, and various modifications or combinations are possible as long as they do not depart from the purpose of the disclosure. For example, the heat source side unit 1 in Embodiment 2 may be replaced by the heat source side unit 1A in Embodiment 3.

Although the description has been given with regard to the case where the refrigeration cycle apparatus 100 is an air-conditioning apparatus as an example in the above embodiments, the refrigeration cycle apparatus 100 may be a cooling apparatus for cooling a space such as a cold and freezing warehouse or other apparatus including a refrigerant circuit.

Although the heat source side heat exchanger 13 and the load side heat exchangers 31a and 31b are each a heat exchanger of a fin-tube type, which is an air-cooled heat exchanger, in the above embodiments, this is not meant to be limiting, and a heat exchanger of a water-cooled type may be used. When a water-cooled heat exchanger is used, the heat source side fan 14 and the load side fans 33a and 33b are each replaced by a water circulation pump, and the controller 17 may control the condensing capacity or the evaporating capacity of each heat exchanger by controlling the rotation speed of the water circulation pump.

The number of load side units included in the refrigeration cycle apparatus 100 is not limited to two as illustrated in FIG. 1, and the refrigeration cycle apparatus 100 may include three or more load side units. In such a case, the relay unit 2 includes a six-way valve or a pair of four-way valves for each load side unit. When at least one of the three or more load side units is to run in cooling operation and at least one of the three or more load side units is to run in heating operation, the controller 17 causes the refrigeration cycle apparatus 100 to operate in the cooling main operation mode if the load for the cooling operation is heavier than the load for the heating operation. When at least one of the three or more load side units is to run in cooling operation and at least one of the three or more load side units is to run in heating operation, the controller 17 causes the refrigeration cycle apparatus 100 to operate in the heating main operation mode if the load for the heating operation is heavier than the load for the cooling operation. Further, the number of heat source side units 1 and the number of relay units 2 are not limited to one either, and the refrigeration cycle apparatus 100 may include a plurality of heat source side units 1 or a plurality of relay units 2.

Although the heat source side unit 1 includes the controller 17 in the above embodiments, either the relay unit 2, the load side unit 3a, or the load side unit 3b may include the controller 17. Alternatively, the controller 17 may be disposed outside the heat source side unit 1, the relay unit 2, and the load side units 3a and 3b. Alternatively, the controller 17 may be divided into multiple controlling components based on functionality, and the controlling components may be included separately in the heat source side unit 1, the relay unit 2, and the load side units 3a and 3b. In these configurations, the controlling components may be connected wirelessly or by wireline to communicate with each other.

Although the second flow switching valve 16 is formed by a four-way valve in the above embodiments, the second flow switching valve 16 may be formed by multiple check valves. Since the number of components in the relay unit 2 is also reduced in this case, the number of components in the refrigeration cycle apparatus 100 can be reduced.

The invention claimed is:

1. A refrigeration cycle apparatus comprising:
a heat source side unit;
a relay unit; and
a plurality of load side units,
wherein the heat source side unit and the relay unit are connected by using a low-pressure pipe and a high-pressure pipe, and
the relay unit and each of the plurality of load side units are connected by using a liquid branch pipe and a gas branch pipe,
wherein the heat source side unit includes
a compressor configured to compress refrigerant,
at least one flow switching valve configured to change a passage of refrigerant based on an operation mode, and
at least one heat source side heat exchanger, and
the relay unit includes
six-way valves or pairs of four-way valves, each of the six-way valves or each of the pairs of four-way valves being connected to each of the plurality of load side units, and
a gas-liquid separator whose inlet is connected to the high-pressure pipe, and
wherein each of the six-way valves or each of the pairs of four-way valves is connected to a gas outlet of the gas-liquid separator, a liquid outlet of the gas-liquid separator, the gas branch pipe and the liquid branch pipe connected to each of the plurality of load side units, and the low-pressure pipe.

2. The refrigeration cycle apparatus of claim 1, further comprising
a controller configured to control either the at least one flow switching valve and each of the six-way valves or the at least one flow switching valve and each of the pairs of four-way valves and cause the refrigeration cycle apparatus to operate in a cooling only operation mode, a cooling main operation mode, a heating only operation mode, or a heating main operation mode,
wherein all of the plurality of load side units are in cooling operation in the cooling only operation mode,
at least one of the plurality of load side units is in the cooling operation, at least one of the plurality of load side units is in heating operation, and a load for the cooling operation is heavier than a load for the heating operation in the cooling main operation mode, all of the plurality of load side units are in the heating operation in the heating only operation mode, and at least one of the plurality of load side units is in the cooling operation, at least one of the plurality of load side units is in the heating operation, and a load for the heating operation is heavier than a load for the cooling operation in the heating main operation mode.

3. The refrigeration cycle apparatus of claim 2, wherein the controller is configured to set at least one of the six-way valves or at least one of the pairs of four-way valves connected to at least one of the plurality of load side units that is to run in the cooling operation to communicate the liquid outlet of the gas-liquid separator and the liquid branch pipe connected to the at least one of the plurality of load side units, and to communicate the low-pressure pipe and the gas branch pipe connected to the at least one of the plurality of load side units.

4. The refrigeration cycle apparatus of claim 2, wherein the controller is configured to set at least one of the six-way valves or at least one of the pairs of four-way valves connected to at least one of the plurality of load side units that is to run in the heating operation to communicate the liquid outlet of the gas-liquid separator and the liquid branch pipe connected to the at least one of the plurality of load side units, and to communicate the high-pressure pipe and the gas branch pipe connected to the one of the plurality of load side units.

5. The refrigeration cycle apparatus of claim 2, wherein the at least one flow switching valve includes a first flow switching valve and a second flow switching valve, the first flow switching valve is connected to a discharge side of the compressor, the at least one heat source side heat exchanger, the high-pressure pipe, and the second flow switching valve, and the second flow switching valve is a four-way valve, and is connected to the first flow switching valve, the at least one heat source side heat exchanger, a suction side of the compressor, and the low-pressure pipe.

6. The refrigeration cycle apparatus of claim 2, wherein the at least one heat source side heat exchanger includes a first heat source side heat exchanger and a second heat source side heat exchanger connected in parallel, and the heat source side unit further includes a first heat source side expansion device connected to one end of the first heat source side heat exchanger, a second heat source side expansion device connected to one end of the second heat source side heat exchanger, and a check valve connected to an other end of the first heat source side heat exchanger.

7. The refrigeration cycle apparatus of claim 6, wherein the controller is configured to fully close the first heat source side expansion device in the cooling main operation mode or the heating main operation mode.

* * * * *